United States Patent [19]

Marchetto et al.

[11] Patent Number: 5,227,741
[45] Date of Patent: Jul. 13, 1993

[54] VARIABLE SPEED ASYNCHRONOUS MODEM

[75] Inventors: Robert F. Marchetto; Todd A. Stewart, both of Vancouver, Canada

[73] Assignee: Glenayre Electronics Ltd., Vancouver, Canada

[21] Appl. No.: 823,842

[22] Filed: Jan. 22, 1992

[51] Int. Cl.$^5$ .................... H03K 7/06; H04L 27/12
[52] U.S. Cl. .................... 332/100; 332/101; 375/45; 375/62
[58] Field of Search .................... 332/100, 101, 102; 375/45, 46, 47, 48, 49, 50, 51, 62, 63, 64, 65, 66

[56] References Cited

U.S. PATENT DOCUMENTS 5,022,054  6/1991  Wang .................... 332/100 X

Primary Examiner—David Mis
Attorney, Agent, or Firm—Christensen, O'Connor, Johnson & Kindness

[57] ABSTRACT

A modem for use in a simulcast paging system includes a modulator (26) and a demodulator (30), both of which produce very low jitter, enabling the modem to be used at data rates well in excess of 1,200 baud. Both the modulator and the demodulator are implemented in software using a digital signal processor (DSP) (66). The modulator initially samples a non-return-to-zero (NRZ) input at a sample rate of 19.2 KHz, interpolates transitions between logic levels, and produces a frequency shift keyed (FSK) modulated signal at a center frequency different than that used for transmitting the modulated signal. Using an interpolation timer that responds to changes in logic level on the input, the modulator changes the frequency of the FSK modulated signal at the appropriate time with much greater accuracy than would be possible without interpolation. The FSK modulated signal is filtered to substantially attenuate frequencies outside a 3 KHz bandwidth, producing a filtered signal. By frequency shifting the filtered signal (either up or down) to a center frequency of approximately 1,700 Hz, interference between positive and negative frequencies is substantially eliminated. A digital-to-analog converter (DAC) (74) produces an analog FSK modulated signal. At a receiving modem (29), the demodulator digitizes the FSK modulated signal at a 19.2 KHz sample rate and shifts the digitized modulated signal to a center frequency of 0 Hz, producing a complex baseband comprising in-phase (real) and quadrature (imaginary) components. The DSP determines the instantaneous phase of the complex baseband signal, and from the time derivative of the instantaneous phase, determines its frequency. The instantaneous frequency is interpolated at eight times the major sample rate, producing an interpolated frequency signal so that changes in the sign of the interpolated frequency can be used to determine the logic level and zero crossing of the demodulated signal with greater resolution, substantially reducing jitter. Correlation of the demodulated signal at the data rate further reduces jitter.

12 Claims, 18 Drawing Sheets

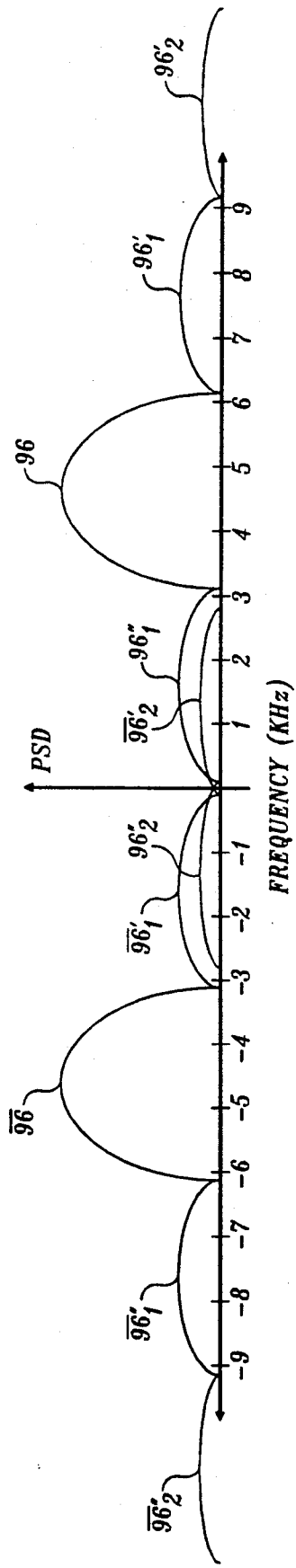
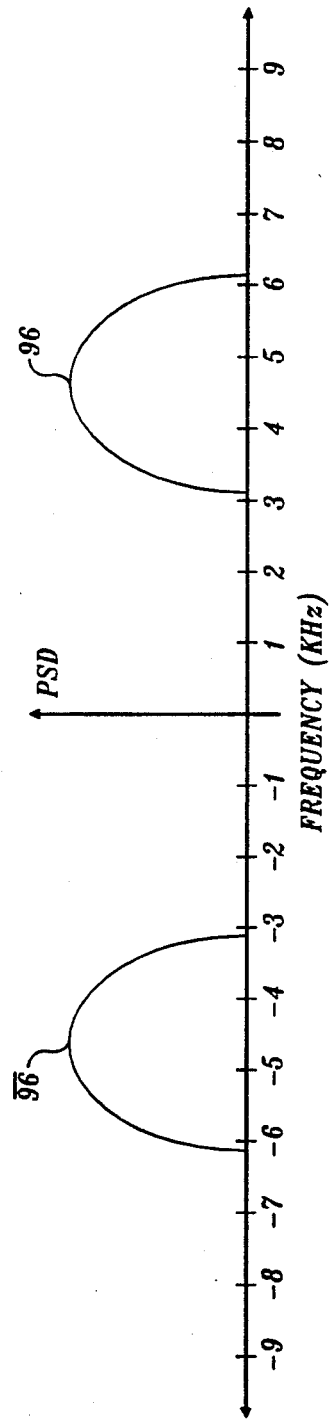
FIG.6A.
FIG.6B.

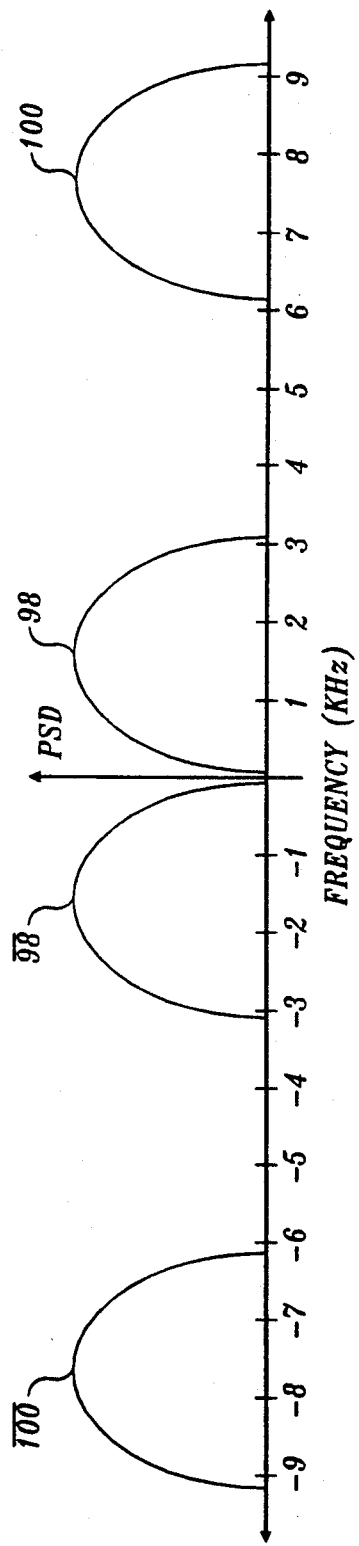
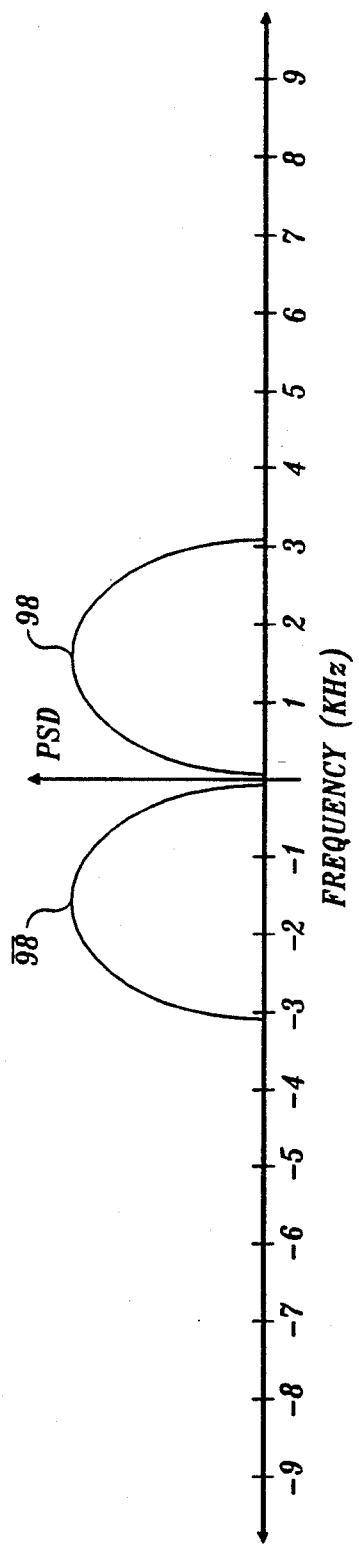

VARIABLE SPEED ASYNCHRONOUS MODEM

FIELD OF THE INVENTION

The present invention generally pertains to an asynchronous modem, and more specifically, to a modulator and demodulator of an asynchronous variable speed modem.

BACKGROUND OF THE INVENTION

Modems are frequently used in paging systems to transmit data over telephone lines or by radio transmission between a central paging terminal and a plurality of paging transmitters, which re-transmit the data as a radio signal to a pager unit carried by an individual subscriber to the paging service. The data received by the paging unit of the intended recipient can then be read by the subscriber on a display screen that is part of the pager unit. To ensure that the data signal reaches the individual's pager unit anywhere in a defined geographic coverage area, the plurality of paging transmitters in the system have overlapping reception zones, and the same data signal is simultaneously broadcast from each of the paging transmitters. Paging systems with this type of simultaneous zone coverage are referred to as simulcast paging systems.

When first developed, simulcast paging systems typically transmitted data to subscribers at a relatively low rate, e.g., 512 or 600 baud. Subsequently, the increased demand on paging systems for higher data throughput as greater numbers of pagers have been placed into service has prompted an increase in the data rate of the modems used to transfer data between the central paging terminal and the paging transmitters to 1,200 baud. Integrated circuit modem chipsets conforming to the Bell 202 or the V.23 standards are readily available to achieve this level of performance. However, there is now a demand for paging modems that can operate at still higher baud rates, e.g., at or above 2,400 baud, because simulcast paging systems are being forced to access still more customers over a limited number of radio channels. It is therefore critically important that each data message be transmitted as rapidly as possible to enable more customers to be serviced. Unfortunately, asynchronous paging modems capable of operating at the higher baud rates are not presently available. Conventional modems are limited in speed, at least for this type of application, for several technical reasons, the most important of which are their inherent isochronous distortion level and maximum data rate limitation of about 1,500 baud.

To achieve data rates in excess of about 1,200 baud, an asynchronous modem suitable for use in a simulcast paging system must be capable of operation at a relatively low isochronous distortion level. Isochronous distortion level is a measure of the difference between the absolute earliest and the absolute latest transitions in a digital data stream, where the transitions are compared to ideal sample times. This type of distortion is thus affected by the time deviation between changes in data logic level (between logic level one and zero for each bit) for the same data signal being transmitted by simulcast paging transmitters having overlapping reception zones. This parameter is also referred to as system jitter. System jitter is an important operating parameter of a simulcast paging system because of its effect on the signal received by an individual's pager unit in the overlappong reception zone of two or more adjacent simulcast paging transmitters. To ensure that the pager unit receives the data signal accurately, the overlapping transmissions of the paging transmitters must be aligned to within approximately one-quarter of a bit time. For example, if the data is transmitted at 2,400 baud, the data edges transmitted by the various paging transmitters must be aligned with respect to each other to within about 104 $\mu$s. A typical maximum overlap area located about ten miles farther from one paging transmitter than the other would contribute approximately 54 $\mu$s misalignment (based on the radio signal propagating over a distance of one mile in about 5.4 $\mu$s at the speed of light), leaving about 50 $\mu$s peak-to-peak (or $\pm 25$ $\mu$s peak) for non-alignment caused by system jitter. Similarly, at 1,200, 600, and 512 baud, the maximum allowable peak system jitter for this propagation condition is about $\pm 75$, $\pm 180$, and $\pm 210$ $\mu$s, respectively. Absolute delays caused by the transmission time between the paging terminal and the paging transmitters of the simulcast paging system are another potential source of differences in the time that bit changes are received by a paging unit in an overlap area, but this source of delay is readily compensated by the system by appropriately delaying the radio transmission from the paging transmitter that is first to receive the data from the central paging terminal, as is well known to those of ordinary skill in the art.

A conventional asynchronous modem of the type used in simulcast paging systems processes non-return-to-zero (NRZ) data with a typical peak system jitter of about $\pm 50$ to $\pm 60$ $\mu$s under optimum laboratory test conditions on a back-to-back modem link, with no noise. Conventional modem chip sets, such as the Texas Instruments TM Type TCM 3105, will not even operate above about 1,500 baud under the 15–20 dB SINAD (signal-to-noise-and-distortion) conditions typical of a paging system link. It will therefore be apparent that prior art simulcast paging system modems are generally limited to about 1,200 baud. What is needed is a relatively low-cost modem that can be used in a simulcast paging system at data rates well above 1,200 baud without introducing excessive system jitter that would disrupt the reception of transmitted data in an overlap area.

Further, a suitable modem for use on a simulcast paging system must include a modulator that is capable of modulating a signal for transmission to a demodulator over a bandwidth of about 3 KHz, thereby insuring its compatibility with existing telephone and radio systems. Frequency shift keyed (FSK) modulators are conventionally used for this purpose. Jitter is particularly a problem for a demodulator processing a modulated signal transmitted over a bandwidth of 3 KHz. Conventional FSK demodulators use auto-correlation or phase-locked loop techniques to determine the binary bits corresponding to a modulated signal. These techniques are inherently too slow to be used on modems operating at data rates above about 1,200 baud.

One of the problems with existing FSK modems operating at data rates above about 1,200 baud, with a bandwidth limited to about 3 KHz, is the aliasing that occurs between positive and negative frequencies used in the FSK signal. The band for the FSK modulated signal is normally centered at about 1,700 Hz and the FSK signal is typically modulated between 1,200 and 2,200 Hz to convey binary data comprising ones and zeros. When the FSK modulation frequencies are generated directly in the frequency band of the transmitted FSK modulated signal, the skirts of the positive frequencies and their corresponding negative frequencies in the frequency spectrum overlap, causing the aliasing problem. Accordingly, a modulator is required for use in a simulcast paging system modem that removes the aliasing of the FSK frequencies from the modulated FSK signal.

SUMMARY OF THE INVENTION

In accordance with the present invention, a modulator for a modem modulates data, producing an output signal conveying the data over a data channel at a data rate. The modulator comprises tone generation means that generate FSK tones, which are modulated by the data about a first center frequency that is substantially different than a center frequency of the data channel that carries the output signal of the modulator. A filter, which is coupled to the tone generation means to receive the modulated FSK tones, produces a filtered signal having a bandwidth that is less than or substantially equal to the bandwidth of the data channel. The modulator also includes means for frequency shifting the filtered signal so that a frequency spectrum of the modulated FSK tones comprising the filtered signal is contained within the data channel, thereby substantially eliminating an interference between positive and negative images of the frequency spectrum of the output signal of the modulator.

In one preferred form of the modulator, the first center frequency is substantially greater than the center frequency of the data channel. The means for frequency shifting are then operative to frequency shift the filtered signal downwardly into the frequency spectrum of the output signal. In another preferred form of the modulator, the first center frequency is substantially equal to zero Hz, so that the FSK tones comprise a signal having a real portion and an imaginary portion. The means for frequency shifting then are operative to frequency shift the filtered signal into the frequency spectrum of the output signal, and the filter has a band pass frequency range that includes zero Hz.

In another aspect of the present invention, the modulator comprises edge detection means that are connected to receive the data to be modulated. The edge detection means detect an edge at which the data changes in state and produce an edge detect signal in response thereto. Changes in the state of the data occur when the data change between logic levels. Interpolation means, coupled to receive the edge detect signal and the data that are to be modulated, sample the data at a predefined sample rate and modulate an FSK signal having upper and lower frequencies centered about a first frequency in response to the logic levels of the data, where the upper frequency corresponds to one logic level and the lower frequency corresponds to a different logic level. The logic level that is used to modulate the FSK signal is determined by the interpolation means as a function of the edge detect signal, thereby increasing the resolution with which the FSK signal is modulated by the data and minimizing jitter in the FSK signal.

A filter is coupled to the interpolation means to receive the FSK signal and substantially attenuates frequencies that are outside of a predetermined bandwidth, producing a filtered FSK signal. The means for shifting are then operative to shift the center frequency of the FSK signal so that it is within a bandwidth of the data channel. The interpolation means preferably comprise a timer and the edge detect signal stops the timer so that it can determine a time interval between when a previous sample interrupt occurred and when an edge occurs, each sample interrupt occurring at times spaced apart by a sample interval defined by the sample rate. Moreover, the interpolation means comprise a processor that interpolates the time during the sample interval at which the edge detect signal indicated a change in the logic level of the data, thereby improving the resolution with which such changes modulate the FSK signal. The modulator also includes an input latch that has an input connected to receive the data and an output coupled to the interpolation means. The input latch temporarily stores the input data while it is sampled by the interpolation means at the sample rate. The data are also preferably coupled asynchronously to the interpolation means, and the data rate is variable, with a maximum value in excess of 1,500 baud.

A digital-to-analog converter (DAC) that has an input coupled to receive the FSK signal produces a corresponding analog FSK signal. A post filter having an input coupled to receive the analog FSK signal produces a filtered analog FSK signal that is output from the modulator.

A still further aspect of the present invention is directed to a demodulator of the modem that is used for demodulating an input signal conveying data over a data channel at a data rate. The demodulator comprises converter means for converting the input signal to a complex signal having an in-phase component and a quadrature component. A filter is coupled to the converter means to receive the complex signal, producing a filtered complex signal from which an undesired side band and noise are removed. Phase determinative means coupled to the filter to receive the filtered complex signal determine an instantaneous phase of the filtered complex signal and produce a phase signal indicative of the instantaneous phase. The demodulator also includes frequency determinative means that are coupled to the phase determinative means to receive the phase signal, for determining an instantaneous frequency of the phase signal, producing a demodulated signal.

Zero crossing correlator means, coupled to the frequency determinative means to receive the demodulated signal, are operative to correlate a zero crossing of the demodulated signal to produce an output signal from which any zero crossing jitter present in the demodulated signal is substantially removed. The zero crossing correlator means operate at a plurality of predefined data rates and include means for selecting the data rate at which the demodulated signal is correlated. In selecting the data rate of the zero crossing correlator means, a data rate substantially equal to the data rate of the input signal is used. In the preferred form of the demodulator, the output signal comprises demodulated non-return-to-zero (NRZ) data.

The converter means preferably comprise digitizer means for sampling the input signal during successive sampling intervals to digitize it. The complex signal is thus a digital signal for which the in-phase and quadrature components correspond to real and imaginary parts of the complex signal in each successive sampling interval. In addition, the demodulator can comprise interpolator means that are coupled to the frequency determinative means to receive the demodulated signal, for sampling the signal at an increased rate compared to a rate at which the digitizer means sample the input signal. The increased rate is selected to increase the resolution with which a zero crossing and thus logic levels of the output signal of the demodulator are determined, thereby reducing zero crossing jitter in the output signal. Furthermore, the demodulated signal preferably comprises a time varying signal having a value determined by changes in the instantaneous phase of the filtered complex signal between successive sampling intervals. This time varying signal represents an NRZ value that changes between one and zero (or vice versa), if the instantaneous phase during a current sampling interval is different (i.e., greater or less) than the instantaneous phase during a previous sampling interval.

The foregoing aspects and many of the attendant advantages of this invention will become more readily appreciated by reference to the following detailed description, when taken in conjunction with the accompanying drawings.

BRIEF DESCRIPTION OF THE DRAWINGS

FIGS. 6A through 6D are plots showing the power spectral density of signals developed in successive processing stages within the present invention to eliminate aliasing between positive and negative frequencies, finally producing the power spectral density shown in FIG. 6D;

DESCRIPTION OF THE PREFERRED EMBODIMENTS

Simulcast Paging System

Figure 1:
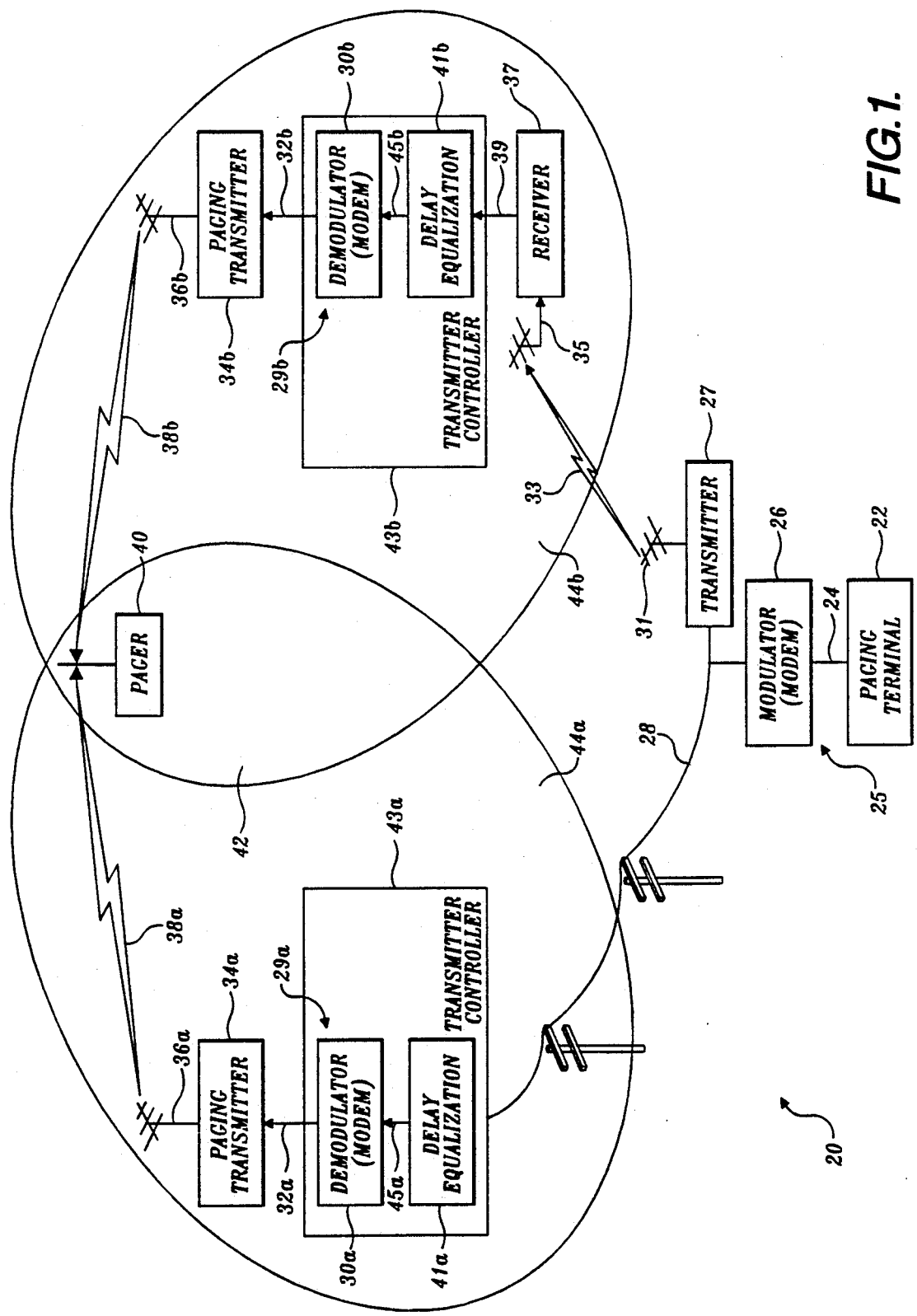
FIG. 1 is a schematic block diagram illustrating a simulcast paging system in which the present invention is used to achieve reliable operation at data rates in excess of about 1,200 baud.

A simulcast paging system in which the present invention is used is shown in FIG. 1, generally at reference numeral 20. Simulcast paging system 20 includes a paging terminal 22, which is a source of data messages that are transmitted to specific pager units carried by customers subscribing to the simulcast paging system. Such data messages are typically generated by other equipment (not shown) that is connected to paging terminal 22, as will be apparent to those of ordinary skill in the art. Associated with paging terminal 22 and connected to it by a data line 24 is a modem 25. (Note that the term modem is a contraction of two words—"modulator" and "demodulator.") In simulcast paging system 20, paging terminal 22 most often transmits modulated data messages to a plurality of paging transmitters 34 rather than receiving messages, and the modulator of modem 25 receives much more use than the demodulator. Therefore, modem 25 is hereafter referred to simply as modulator 26, it being understood that both the modulator and demodulator functions of the modem are available to paging terminal 22.

The data messages input to modulator 26 from paging terminal 22 are typically in the form of NRZ data; however, other data formats can also be modulated by modulator 26, including analog data in the form of compressed voice communications. As explained below, modulator 26 produces a modulated signal that conveys the data supplied from paging terminal 22 to each of the plurality of paging transmitters 34. In FIG. 1, only two such paging transmitters 34a and 34b are shown for purposes of illustration, but it will be understood that simulcast paging system 20 typically includes many more such paging transmitters, some of which may be connected to paging terminal 22 by a radio frequency (RF) link 33, as is paging transmitter 34b, instead of by telephone lines 28, as is paging transmitter 34a.

The modulated signal produced by modulator 26 is conveyed over telephone lines 28 and transmitted by a transmitter 27 from an antenna 31 to corresponding modems 29a and 29b, respectively. In the case of paging transmitter 34b, an antenna 35 receives the modulated signal and supplies it to a receiver 37. Transmitter controllers 43 located at each paging transmitter site include modems 29 and delay equalization circuits 41. The modulated signal conveyed by telephone lines 28 is input to a delay equalization circuit 41a in transmitter controller 43a and after being appropriately compensated for transmission delay, is input to modem 29a on a line 45a. Similarly, a received modulated signal output from receiver 37 is coupled by a line 39 to delay equalization circuit 41b in transmitter controller 43b. After an appropriate time delay is applied, the modulated signal is input over a line 45b to modem 29b. Any differences in the time required for the modulated signal to propagate from modulator 26 to each paging transmitter is thus compensated in their corresponding transmitter controllers 43a and 43b by delay equalization circuits 41, which add appropriate compensating time delays to the signal path.

Since the paging transmitters primarily use the demodulator portion of modems 30 for demodulating data messages transmitted from paging terminal 22, they have only an occasional need of the modulator portion of the modem. Accordingly, modems 29a and 29b are hereafter referred to simply as demodulators 30a and 30b. Nevertheless, the modulator capability of the modems installed at the paging transmitters is available to paging transmitters 34a and 34b when needed and is periodically used by them for transmission of system-related data messages back to paging terminal 22, for example, in responding when each paging transmitter is occasionally poled in sequence by the paging terminal.

Demodulators 30 process the modulated signal transmitted via telephone lines 28 and RF radio link 33 from paging terminal 22, demodulating the signal to produce the data message conveyed thereby, which is input to their corresponding paging transmitter 34. Paging transmitters 34a and 34b each modulate an RF carrier at the same frequency, transmitting the data message through antennas 36a and 36b, respectively, as radio signals 38a and 38b. The radio transmissions are received by, for example, a pager unit 40, which is carried by a subscriber to the paging service who is the intended recipient.

Associated with each paging transmitter 34 is a reception zone 44 that is defined by the limits of usable signal strength of radio signals 38. If pager unit 40 is disposed within reception zone 44a of paging transmitter 34a, but is not within the reception zone 44b of paging transmitter 34b (or the reception zone of any other paging transmitter), it responds only to radio signal 38a of paging transmitter 34a. On the other hand, if pager unit 40 is disposed within an overlap area 42 of reception zones 44a and 44b of paging transmitters 34a and 34b, it receives and may respond to radio signals 38a and 38b from both paging transmitters.

As noted above in the Background of the Invention, proper reception of the data message by pager unit 40 requires that overlapping radio signals 38a and 38b be aligned (in time) within approximately one-quarter of a bit of the data message reaching the paging unit. Since differences in the time for the radio signals 38a and 38b to propagate from their respective paging transmitters to pager unit 40 may account for a significant portion of the quarter bit window, isochronous distortion or "system jitter" must be maintained at a relatively low level that is at least less than the remainder of the quarter-bit time. System jitter should be controlled and limited at both modulator 26 and demodulators 30 to avoid exceeding the maximum quarter bit misalignment time (104 $\mu$s at 2,400 baud). Accordingly, modulator 26 and demodulators 30 have been designed to achieve a substantially lower system jitter level than prior art modems used in simulcast paging systems, yielding a maximum peak jitter of $\pm 10$ $\mu$s for the system under no-noise laboratory test conditions at 2,400 baud, and a maximum peak jitter of $\pm 16$ $\mu$s at 15 dB SINAD noise levels, substantially below the maximum $\pm 25$ $\mu$s peak jitter contribution at 2,400 baud allowed in the example discussed in the Background of the Invention.

Figure 5:
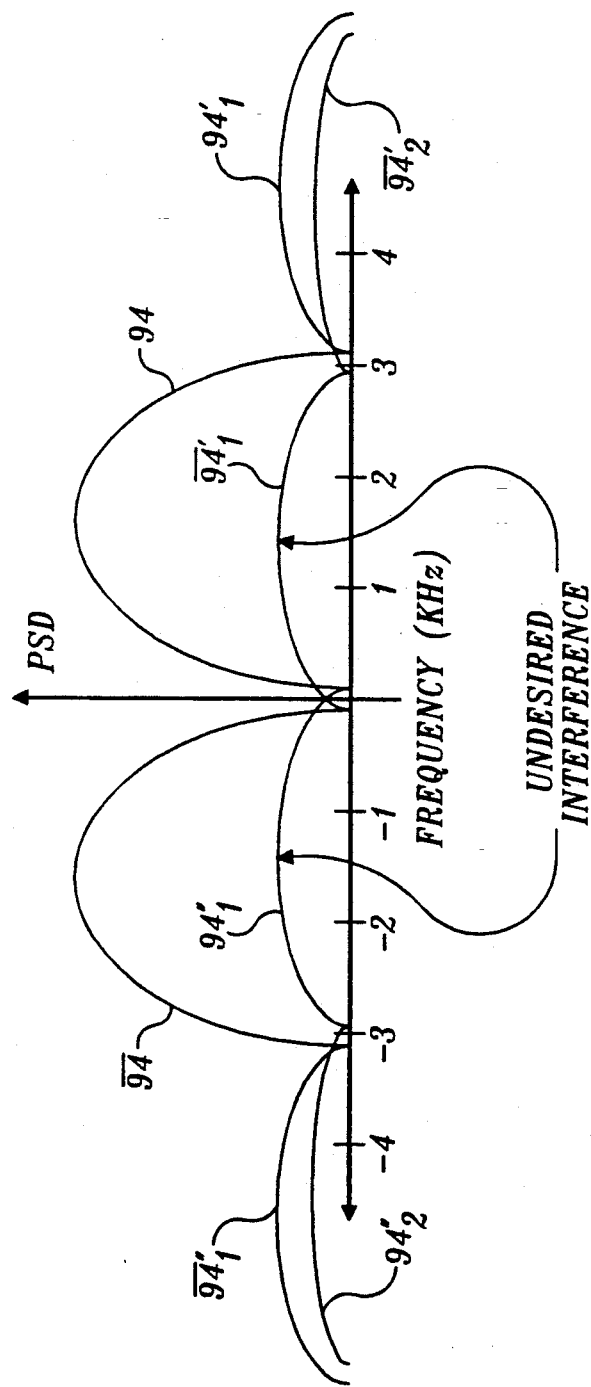
FIG. 5 is a plot of the power spectral density of a prior art FSK modulator that generates its output tones directly in the audio band used for the FSK modulated signal that it produces.

In addition to achieving a remarkably low system jitter level, modulator 26 avoids another problem that frequently occurs when conventional modems must modulate a data message within the 3 KHz bandwidth that is typically available for transmission of modulated signals over radio links or telephone lines 28, particularly when operated at data rates in excess of 1,200 baud. This problem relates to aliasing or the interference between positive and negative frequencies of the modulated signal. FIG. 5 graphically illustrates a power spectral density 94 (and its corresponding negative frequency power spectral density $\overline{94}$) for a prior art modem operating with a 3 KHz bandwidth centered about 1,700 Hz. The prior art modem typically would generate FSK tones directly within the bandwidth of power spectral density 94, and thus, would produce an FSK modulated signal subject to interference between positive and negative frequencies of the FSK tones and their alises. Power spectral density 94 has a higher frequency side lobe $94'_1$ and lower frequency side lobes $94''_1$ and $94''_2$. Similarly, it will be apparent that negative power spectral density $\overline{94}$ includes side lobes $\overline{94''}_1$, $\overline{94'}_1$, and $\overline{94'}_2$. An undesired interference occurs between side lobe $\overline{94'}_1$ and the main lobe 94. Likewise, an undesired interference occurs between negative main lobe $\overline{94}$ and side lobe $94''_1$. The degree of interference depends on the baud rate, the frequency separation between the two FSK tones used for modulation, and the center frequency of the transmitted signal. This interference is worse at higher baud rates and higher frequency separations between the FSK tones, and when the center frequency is lower. By comparison, modulator 26 generates the FSK tones using a modified continuous phase FSK technique that effectively eliminates any interference between positive and negative frequencies.

Description of Modulator

Figure 2A:
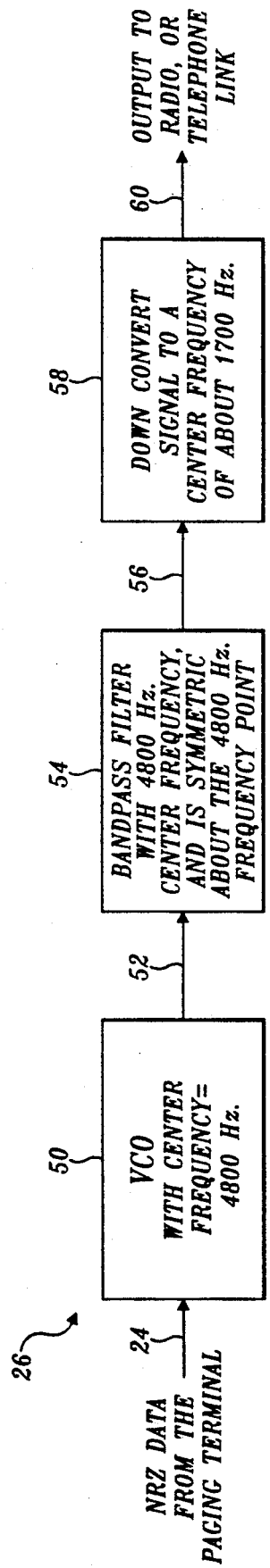
FIGS. 2A and 2B are functional block diagrams of two embodiments of an FSK modulator in which aliasing between positive and negative frequencies is eliminated, in accordance with the present invention.

A first preferred method used by modulator 26 for generating FSK tones without interference between positive and negative images of the tones is shown in FIG. 2A. The NRZ data from the paging terminal is input to a voltage controlled oscillator (VCO) having a center frequency equal to approximately 4,800 Hz, as shown in a block 50. The VCO responds to the NRZ data from the paging terminal by producing an FSK modulated signal that has a frequency of approximately 5,520 Hz when a logic level 0 appears in the data message and a frequency of about 4,080 Hz in response to a logic level 1.

The FSK modulated signal is band pass-filtered by a filter having approximately a 3 KHz bandwidth that is centered around and symmetric to 4,800 Hz, as shown in a block 54. This band pass filtering operation produces a filtered signal 56 that is input to a block 58, wherein the filtered signal is down converted by shifting the filtered signal so that its 3 KHz bandwidth is centered about 1,700 Hz, instead of 4,800 Hz. A filtered and down converted (frequency shifted) modulated signal 60 is then available for transmission to the paging transmitters by radio or telephone link.

FIGS. 6A through 6D illustrate the benefits of generating the FSK modulated signal outside of the normal bandwidth of the signal output from modulator 26. A power spectral density 96 for the FSK modulated signal as originally generated is shown in FIG. 6A, centered at 4,800 Hz, with a bandwidth of approximately 3 KHz. Power spectral density 96 has higher side lobes $96'_1$ and $96'_2$, and corresponding lower side lobes $96''_1$ and $96''_2$, extending into the negative frequency spectrum. A corresponding negative frequency power spectral density $\overline{96}$ similarly includes side lobes $\overline{96}'_1$ and $\overline{96}'_2$ with negative side loves $\overline{96}''_1$ and $\overline{96}''_2$. After the band pass filtering operation is carried out in block 54 of FIG. 2A, the power spectrum densities of the side lobes are substantially attenuated, if not entirely eliminated, as shown in FIG. 6B, leaving only the power spectral density 96 centered at 4,800 Hz and its corresponding negative image power spectral density $\overline{96}$ centered and −4,800 Hz.

In FIG. 6C, the positive and negative frequency power spectrum densities are down converted, yielding a positive power spectral density 98 centered at 1,700 Hz with a corresponding negative frequency image power spectral density $\overline{98}$ centered at −1,700 Hz. The FSK modulated signal is down converted or shifted to a lower center frequency by multiplying it by the cosine of 3,100 Hz. This method of down converting also produces power spectral densities 100 and $\overline{100}$. Although power spectral densities 100 and $\overline{100}$ may lie outside the usable bandwidth for the transmitted modulated signal, they are preferably eliminated by using a low pass filter than substantially attenuates frequencies in excess of approximately 4,800 Hz, yielding the power spectral densities shown in FIG. 6D.

Figure 2B:
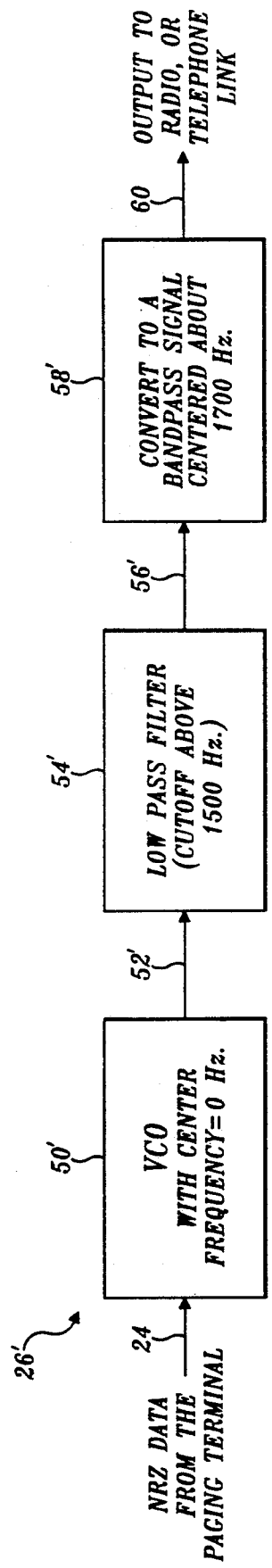

In FIG. 2B, an alternative method for eliminating the interference between positive and negative frequencies and their aliases is shown for use in a modulator 26'. In this embodiment, the VCO in a block 50' generates an FSK modulated signal 52' having a center frequency at DC or 0 Hz. The bandwidth of the modulated signal thus produced is 3 KHz, ranging between −1,500 Hz and +1,500 Hz. FSK modulated signal 52' is low pass filtered, thereby attenuating all frequencies in excess of 1,500 Hz and yielding a filtered signal 56'. In a block 58', the filtered signal is converted to a pass band signal by shifting it to a center frequency of about 1,700 Hz. Following the shifting of frequency that occurs in block 58, the FSK modulated signal that is output from modulator 26' has the same power spectral density 96 as the output signal from modulator 26, as shown in FIG. 6D. Regardless of whether the method shown in FIG. 2A or the method in FIG. 2B is used, virtually all interference between positive and negative frequency images is eliminated in the FSK modulated output signal that is produced by modulator 26 (or 26'), so that the result is identical.

Figure 3:
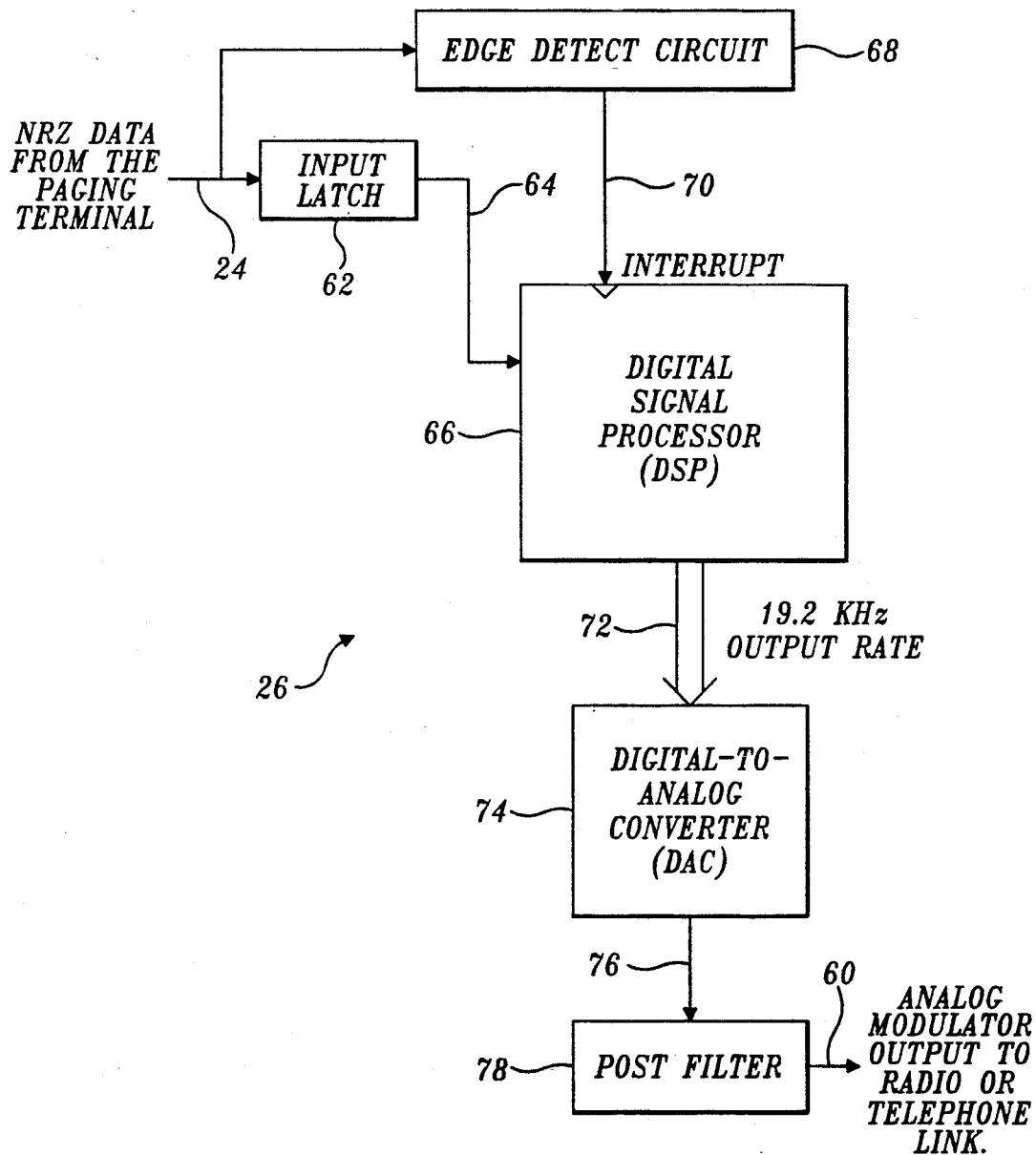
FIG. 3 is a block diagram showing components of the modulator.

A block diagram of modulator 26 is shown in FIG. 3. It should be apparent that the modulator functions thus described can be implemented in an electronic circuit using discrete components. However, in the preferred embodiment, most of the functions of modulator 26 are carried out in software. The NRZ data from paging terminal 22 are applied to an input latch 62, which temporarily stores the data for digital sampling by a digital signal processor (DSP) 66. An input port on DSP 66 is connected to input latch 62 by a signal line 64. The NRZ data are also applied to an edge detect circuit 68. Edge detect circuit 68 produces an edge detect signal indicating the point in time when the NRZ data makes a transition from one logic level to another. The edge detect signal is connected to an interrupt port on DSP 66 via a line 70; the purpose of the edge detect signal will be apparent from the more detailed explanation of the functions carried out by DSP 66, which follows.

DSP 66 is programmed to function as a VCO in producing a digital FSK modulated signal 72, generally as described with respect to FIG. 2A, or alternatively, with respect to FIG. 2B. Digital FSK modulated signal 72 is produced by generating the FSK tones outside of the transmission band, filtering the FSK signal to eliminate unwanted aliasing, and then frequency shifting the signal so that it is centered about 1,700 Hz. Since the modulated signal is a digital signal, it is applied to a digital-to-analog converter (DAC) 74, which converts the digital FSK modulated signal to a corresponding analog FSK modulated signal 76. The analog FSK modulated signal is applied to a conventional analog post filter 78, which further low pass filters the signal to substantially attenuate frequencies above the signal's 3 KHz bandwidth.

Figure 4:
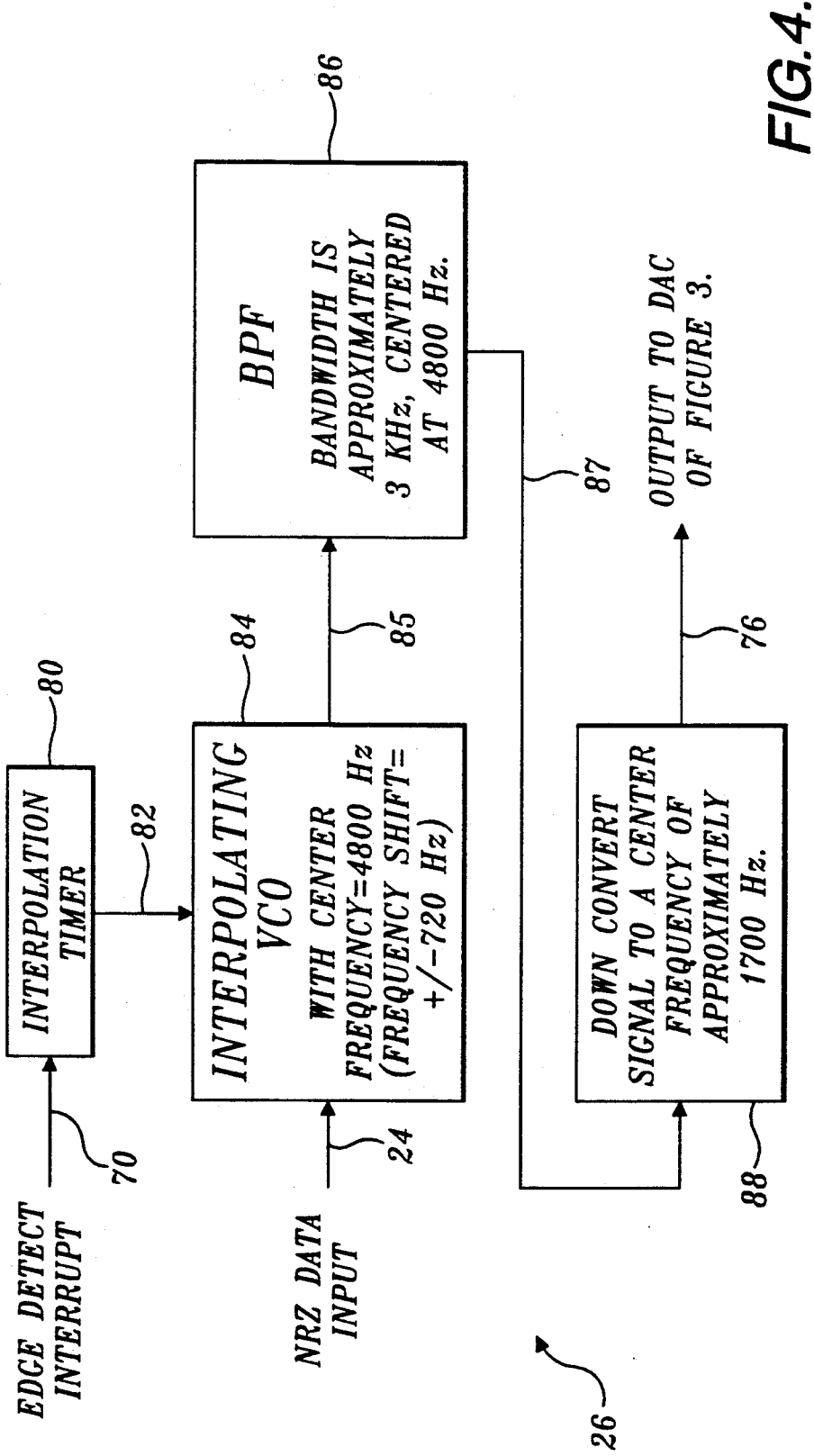
FIG. 4 is a functional block diagram of the modulator illustrating the use of interpolation to increase the resolution with which the FSK signal is modulated in response to input data.

Turning now to FIG. 4, another novel aspect of modulator 26 is shown that is implemented by DSP 66 in the preferred embodiment. As described above, the inherent system jitter exhibited by conventional modems virtually precludes their use on simulcast paging system 20 at data rates above about 1,200 baud. Modem 26 is capable of data transfer rates in excess of 2,400 baud in part due to its low jitter level.

To reduce system jitter, modulator 26 preferably includes an interpolating VCO function, which enhances the resolution with which changes in logic level on the NRZ data input to the modulator occur, as reflected in the FSK modulated signal output from modulator 26. To provide this enhanced resolution, an interpolation timer 80 counts down from a predetermined value until an edge detect signal input over line 70 interrupts the count. When its count is interrupted, interpolation timer 80 transfers its then current count 82 into an interpolating VCO 84. Interpolating VCO 84 samples the NRZ data that is input to it at a sample rate of 19.2 KHz in the preferred embodiment; absent the input of count 82 from interpolation timer 80, interpolating VCO 84 would be unable to resolve when a change in logic level occurred with any greater precision than the duration of one major sample interval (i.e., 52 $\mu s$, the period of the sample rate). However, by using count 82 from interpolation timer 80, interpolating VCO 84 can resolve the time when a change in logic level has occurred to within about 0.08 $\mu s$, since the interpolation timer counts at an effective clock frequency of 12 MHz.

Figure 7:
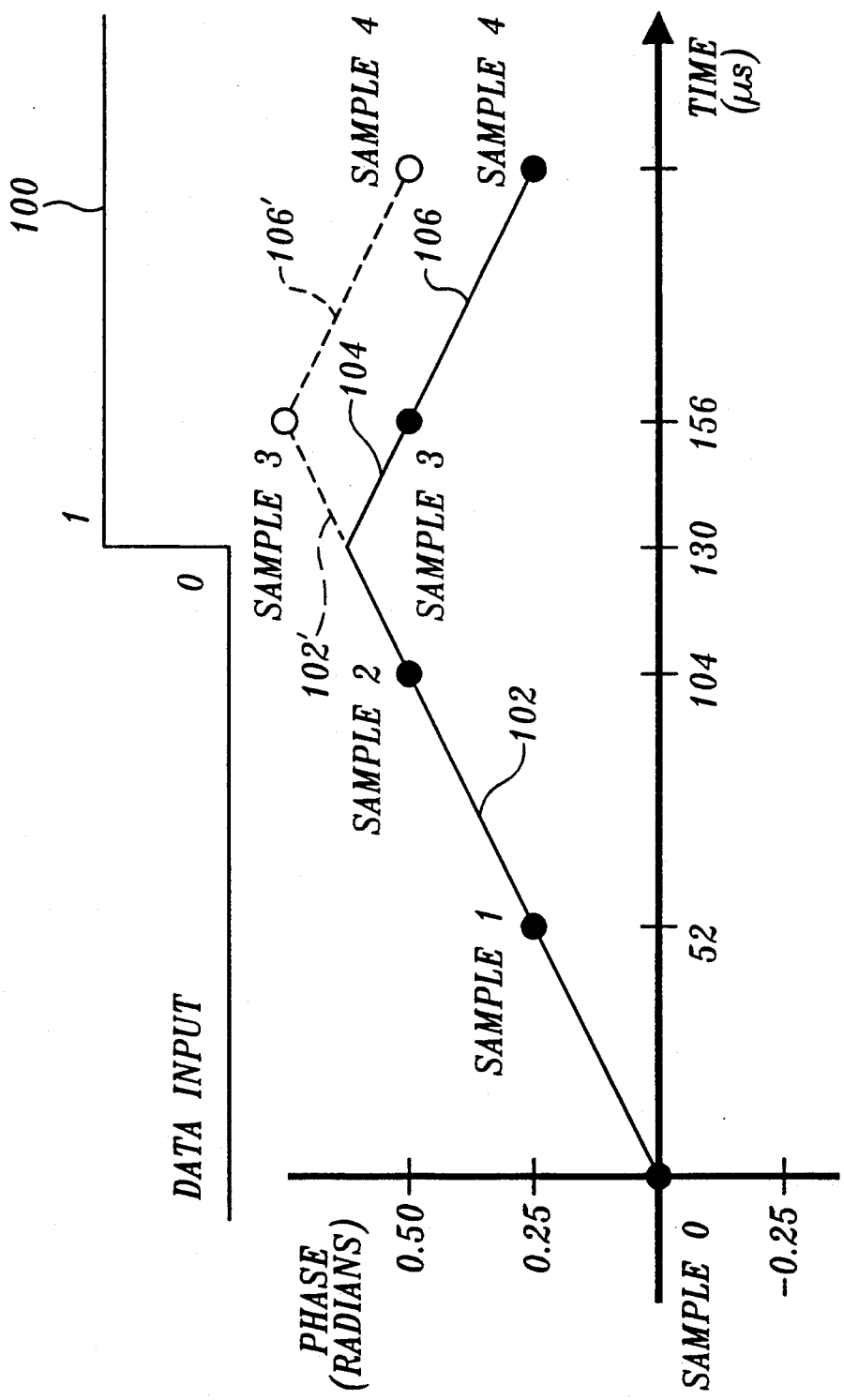
FIG. 7 is a plot of phase trajectory with interpolation, as in the present invention, and phase trajectory without such interpolation.

In FIG. 7, details of the interpolation process are illustrated to show how it improves the timing (phase) accuracy with which changes in logic level on the input signal are resolved in the FSK modulated output signal. At the preferred sample rate of 19.2 KHz, the input signal is sampled or digitized every 52 $\mu s$, so that changes in the phase (in radians) of the FSK modulated output signal would normally be detected only at intervals of 52 $\mu s$, i.e., each time that the input signal is sampled to determine its logic level state. The frequency shift from +720 Hz above the center frequency to −720 Hz below the center frequency (or vice versa) that occurs at each change in the logic level of the input signal is represented in FIG. 7 as a positive or negative phase angle that changes at a constant linear rate, with either a positive or a negative slope, depending upon the logic level represented. A change in logic level reverses the slope of the phase angle. However, changes in logic level can normally only be determined in a digital FSK modulator each time that the input signal is sampled.

A line 102 in FIG. 7 shows the linear change in phase that occurs in modulator 26 during major samples 1 and 2, which are taken at 52 and 104 $\mu s$, respectively. Without the interpolation used in modulator 26, the change in the logic level of the input signal that occurs at 130 $\mu s$ would not be detected until the next major sample 3, thereby allowing the phase to continue to change with a positive slope as indicated by a dashed line segment 102' until sample 3 occurs at 156 μs. However, by interpolating the time at which the bit transition occurs at 130 μs, modulator 26 changes the slope of the phase for the FSK modulated output signal at the proper time, as indicated by a line 104. As a result, the phase at sample 3 does not include an error, as would occur without interpolation, and sample 4 is also on the proper phase trajectory as indicated by a line 106. A dashed line 106' illustrates what the phase of sample 3 and sample 4 would have been without interpolation.

An interpolated FSK modulated signal 85 produced by interpolating VCO 84 is centered about 4,800 Hz, as described above, with the FSK tones shifting −720 Hz and +720 Hz about the center frequency, depending upon the logic level of the NRZ data input to modulator 26. This signal is applied to a band pass filter 86 having a bandwidth of approximately 3 KHz centered at 4,800 Hz to eliminate aliasing interference between positive and negative frequency images in the FSK modulated signal. A resulting filtered signal 87 is applied to a down converter 88 that shifts the center frequency from 4,800 Hz to approximately 1,700 Hz, as described above with respect to FIG. 2A, producing digital modulated FSK signal 76 that is applied as an input to DAC 74, shown in FIG. 3.

Details of the interpolation process carried out by DSP 66 to perform the functions of interpolating VCO 84 in the preferred embodiment are discussed below. It will be apparent that the functions of interpolating VCO 84 could also be implemented in a hardware circuit using conventional electronic components to produce the interpolated FSK modulated signal; however, the cost and complexity of such a modulator circuit would be substantially greater than that of DSP 66.

Either of the two methods used to prevent interference between positive and negative images of the FSK modulated signal that were disclosed with respect to FIGS. 2A and 2B can be used independently of the interpolation provided by interpolating VCO 84. Similarly, the interpolation of the time during each major sample period (at the 19.2 KHz rate) at which changes in logic level on the input signal occur that is used in producing the FSK modulated output signal is independent of the methods used to avoid interference between positive and negative frequency images. These functions have been disclosed in separate functional block diagrams (FIGS. 2A and 2B, and FIG. 4) to emphasize that they are independent aspects of modulator 26 (or 26').

Figure 8A:
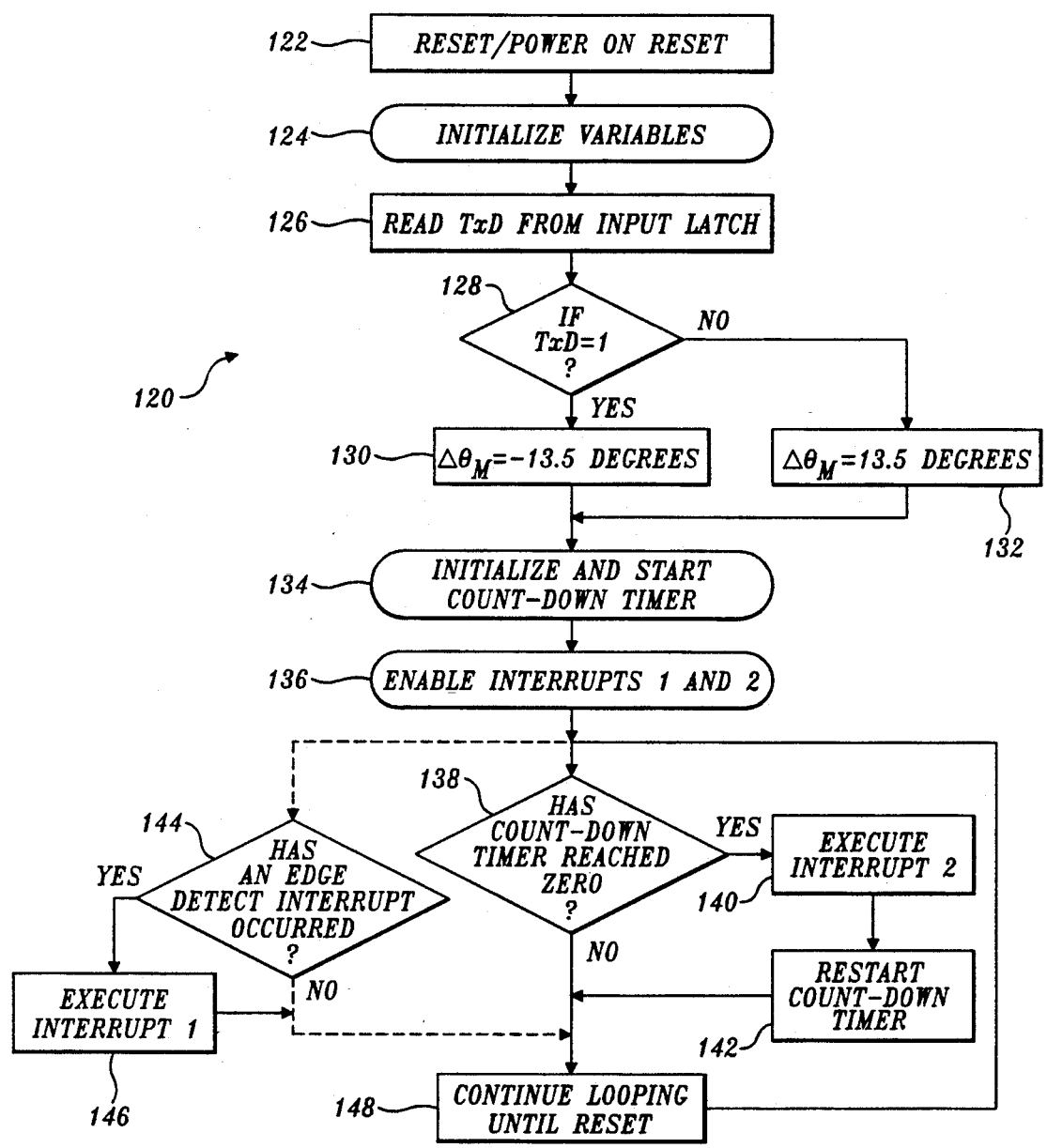
FIGS. 8A, 8B, and 8C are flow charts illustrating the logical steps implemented by the modulator comprising the present invention, in producing an FSK modulated signal.
Figure 8B:
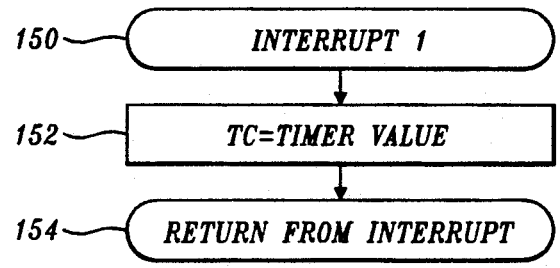
Figure 8C:
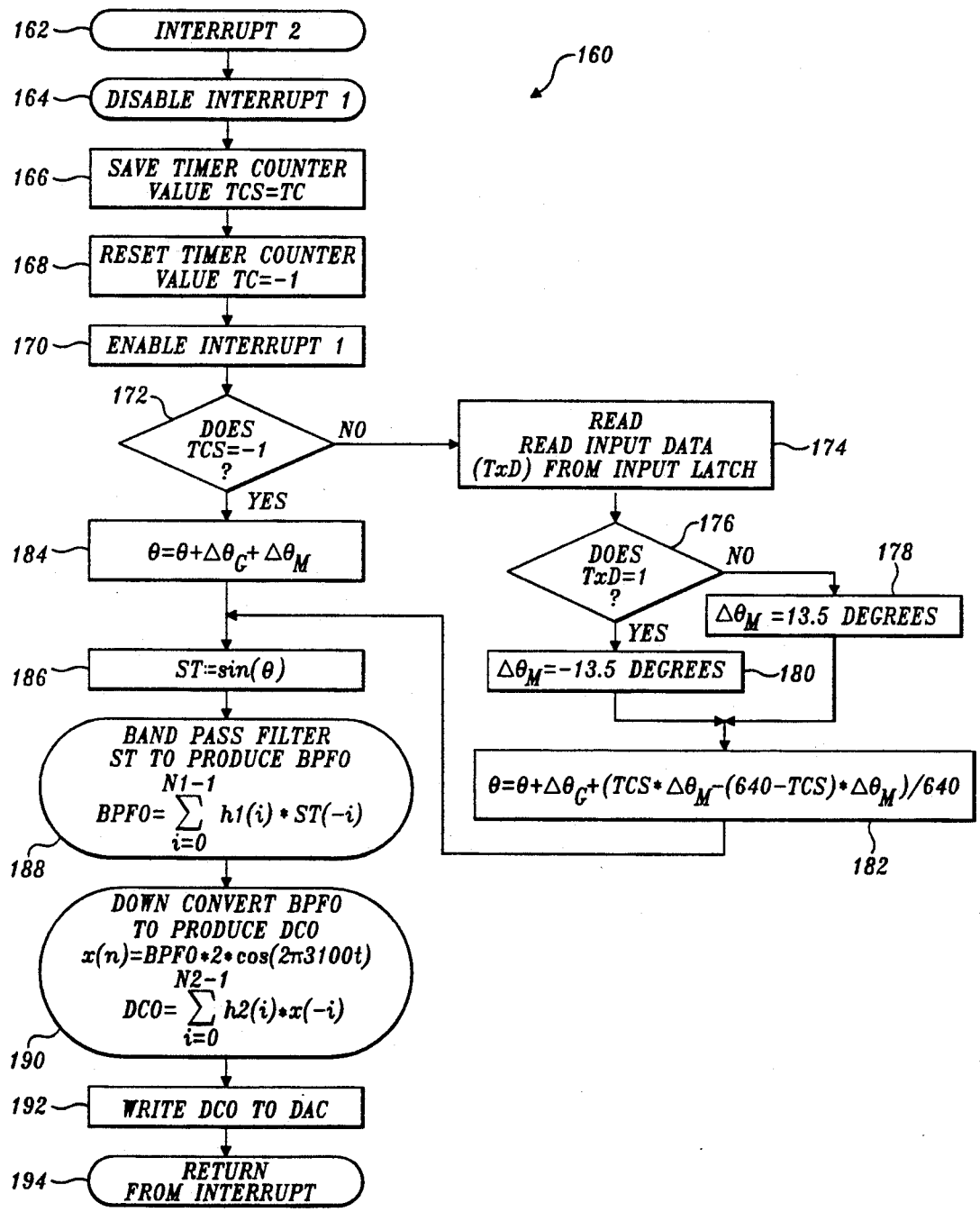

FIGS. 8A through 8C disclose the logical steps implemented by DSP 66 in carrying out the above-described functions. In FIG. 8A, a flow chart 120 defines a reset routine for initializing variables, starting interpolation timer 80, and enabling interrupts 1 and 2. A block 122 starts with resetting the DSP, which occurs automatically each time modulator 26 is powered up or reset. A block 124 initializes various variables that are used throughout the modulation process, as will be apparent during the following discussion of the remaining steps implemented in FIGS. 8A through 8C. In a block 126, DSP 66 reads the NRZ input signal (identified by "TxD") from input latch 62 (see FIG. 3). The input signal is sampled and digitized by DSP 66, and in a decision block 128, DSP 66 determines if the input signal is equal to a logic level 1. Assuming that the result of this inquiry is negative, i.e., that the input signal is a logic level zero, a block 132 sets a variable $\Delta\theta_M = 13.5°$. Alternatively, if the input is equal to a logic level 1, a block 130 sets $\Delta\theta_M = -13.5°$. The variable $\Delta\theta_M$ is used in determining the frequency of the FSK modulated signal, as explained below.

Following blocks 130 or 132, a block 134 initializes and starts interpolation timer 80 counting down from a preset value of 640 to zero. Interpolation timer 80 preferably automatically resets, so that it repetitively continues counting from 640 to zero until interrupted by edge detect signal 70. The rate at which interpolation timer 80 counts is determined by a 12 MHz crystal-controlled timebase (not shown) for DSP 66, so that each count of the countdown timer occurs at 0.08 μs intervals. Interpolation timer 80 counts down from 640 to zero at a rate of 19.2 KHz, thus finishing the countdown at the end of each period of the 19.2 KHz sample rate. However, in the event that edge detect circuit 68 detects a transition from a logic level zero to logic level 1 or vice versa, the edge detect signal that is produced as a result causes countdown interpolation timer 80 to store its count when the interrupt occurred.

A block 138 determines if interpolation timer has reached zero, and if not, proceeds to a block 148 to continue looping back to decision block 138 until a reset occurs. Running parallel with the loop from block 148 back to decision block 138 is another loop that leads to a decision block 144, which determines whether an edge detect interrupt signal has occurred. This loop is shown with a dash line, to indicate that it is an interrupt sequence (as opposed to a logical sequence that is always run), which is initiated when edge detect interrupt signal 70 is output from edge detect circuit 68. At such time that the edge detect signal occurs, a block 146 executes interrupt 1.

The interrupt 1 routine is shown in FIG. 8B, starting at a block 150. In a block 152, the interrupt routine sets a value TC equal to the current timer value when the edge detect interrupt signal occurs. Thus, the value TC equals the current count of interpolation timer 80 when the edge detect interrupt signal is produced. Once the value TC is set, a block 154 returns from interrupt 1, proceeding on with block 148. As soon as the value of TC is set to the current timer value during the execution of interrupt 1, the interpolation timer continues its countdown. When the countdown of interpolation timer has reached zero, decision block 138 transfers the logic to a block 140 that executes interrupt 2.

Details of interrupt 2 are shown in a flow chart 160 (FIG. 8C), starting with the execution of the interrupt in a block 162. In a block 164, interrupt 1 is disabled, thereby preventing any data transitions from resetting the value of TC to the current timer value. Instead, block 166 saves the current value of TC in a variable TCS and then in a block 168, resets the timer counter value TC to −1; this value of TC is a flag to indicate that interrupt 1 has not occurred. A block 170 enables interrupt 1 so that it can respond to the next edge detect signal that is generated when the next data transition from a zero to one or vice versa occurs. While interrupt 1 is disabled between blocks 164 and 170, the interpolation timer continues running. Any edge trigger interrupt that occurred during this short delay (approximately one μs) causes interrupt 1 to be immediately executed once it is again enabled in block 170, and thus, the short delay has very little effect on the overall performance of the system.

A decision block 172 determines if the current value of TCS is equal to −1, i.e., if an edge detect interrupt signal did not occur since the last time that countdown interpolation timer 80 reached a zero count. Assuming that TCS equals −1, an interrupt 1 has not occurred since the last interrupt 2, and there has been no bit transition on the input data. Modulator 26 thus continues to generate the same FSK tone that it did during the last interrupt 2. A value for the angle $\theta$ is thus defined by the following expression in a block 184:

$$\theta = \theta + \Delta\theta_G + \Delta\theta_M \tag{1}$$

In the above equation 1, $\Delta\theta_G$ is a constant 90° and $\Delta\theta_M$ is either +13.5° or −13.5°, depending upon the logic level of the input data. The value of $\theta$ determines the FSK modulation frequency, where the FSK modulation tones are either (4,800+720) Hz or (4,800−720) Hz, as a function of the sin $\theta$, as noted below.

Assuming that TCS does not equal −1, indicating that an interrupt 1 has occurred since the last interrupt 2, the logic proceeds to a block 174, wherein DSP 66 reads the input data (TxD) from input latch 62. A decision block 176 determines if the input data is equal to one, and if not, a block 178 sets $\Delta\theta_M=13.5°$. However, if the input is at a logic level 1, a block 180 instead sets $\Delta\theta_M=-13.5°$. Thereafter, a block 182 performs the required interpolation by determining $\theta$ from the following expression:

$$\theta = \theta + \Delta\theta_G = (TCS^*\Delta\theta_M - (640 - TCS)^*\Delta\theta_M)/640 \tag{2}$$

The new value of $\theta$ defined by equation 2 determines the shift in the FSK tones of +720 Hz or −720 Hz relative to the center frequency of 4,800 Hz. When the edge detect interrupt signal has occurred since the last time that an interrupt 2, $\theta$ is redefined to include as interpolated angle contribution for the time interval between the edge triggered interrupt signal and the last interrupt 2. This interpolation is represented by the last term in equation 2. As a result of the interpolation, the output of modulator 26 stays at the previous modulation frequency for the time required for the interpolation timer to count from 640 down to the value TCS, and then it shifts to the new frequency for the time required for the interpolation timer to count from TCS down to zero. The term $(\theta + \Delta\theta_G)$ determines the center frequency of 4,800 Hz, and the term $(TCS^*\Delta\theta_M)/640$ provides the contribution to $\theta$ from the new data bit, where (TCS/640) is the fraction of the time since the last interrupt to occur that the new data bit was present, and the term $((640-TCS)^*(-\Delta\theta_M)/640)$ is a contribution to $\theta$ from the old data bit. The term $((640-TCS)/640)$ is the fraction of the last sample period since the last interrupt 2 occurred that the old data bit was present, and the term $(-\Delta\theta_M)$ is the corresponding $\Delta\theta_M$ for the old data bit.

Following blocks 182 or 184, a value ST is determined by taking the sine of $\theta$, i.e., ST=sin $\theta$, as shown in a block 186. After the value ST is determined in block 186, DSP 66 band pass filters ST in a block 188 to produce a band pass filtered output (BPFO) signal, which is defined by the following expression:

$$BPFO = \sum_{i=0}^{N1-1} h1(i)^*ST(-i) \tag{3}$$

In equation 3, N1 equals 57, and the h1(i) are filter coefficients each of the N1 values of ST that are summed. The band pass filter operation is thus implemented digitally as a finite impulse response (FIR) filter by DSP 66, using the last 57 values for ST to determine BPFO.

In a block 190, DSP 66 down converts the BPFO signal to produce a down converted output (DCO) signal. Initially, a value x(n) is calculated as follows:

$$x(n) = BPFO^*2.^* \cos(2\pi 3100 t) \tag{4}$$

The signal represented by x(n) has a power spectral density like that shown in FIG. 6C and is developed using a well known technique in communications. Specifically, by multiplying the 4,800 Hz signal in the time domain by the cosine of 3100 Hz, duplicate signals of the input signal are produced in the frequency domain; the duplicate signals are centered at (4,800+3,100=) 7,900 Hz and at (4,800−3,100=) 1,700 Hz. The DCO signal is then determined by low pass filtering x(n), which DSP 66 does with a conventional digital FIR low pass filtering technique defined by the following expression:

$$DCO = \sum_{i=0}^{N2-1} h2(i)^*x(-i) \tag{5}$$

In equation 5, N2 equals 61, and the h2(i) are low pass filter coefficients that are applied to the last 61 values of x(i). The resulting sum defines the DCO signal, which comprises low pass filtered digital modulated signal 72. In determining the BPFO signal in block 188 and the DCO signal in a block 190, DSP 66 uses prior values for ST and for x(n) that have been stored in a 2 KByte random access memory (RAM) provided in the DSP. The constant filter coefficients h1(i) and h2(i) used in equation 3 and equation 5 define the unit impulse response of these two filters. The filter coefficients h1(i) attenuate frequencies outside the 3 KHz pass band for the band pass filter in block 188, and the filter coefficients h2(i) are used to attenuate frequencies above the FSK modulated signal in block 190. The digital values of BPFO, x(n), and DCO comprising these signals, respectively, are thus updated each time that interrupt 2 is executed.

In a block 192, the DCO signal is input to DAC 74 (FIG. 3), so that the corresponding analog modulated output signal can be produced. In a block 194, flow chart 160 returns from interrupt 2, proceeding in a block 142 to restart the interpolation timer. Alternatively, block 142 can be omitted, since the interpolation timer executed by DSP 66 can be made to auto-restart each time that the zero count is reached.

DESCRIPTION OF THE DEMODULATOR

Figure 9:
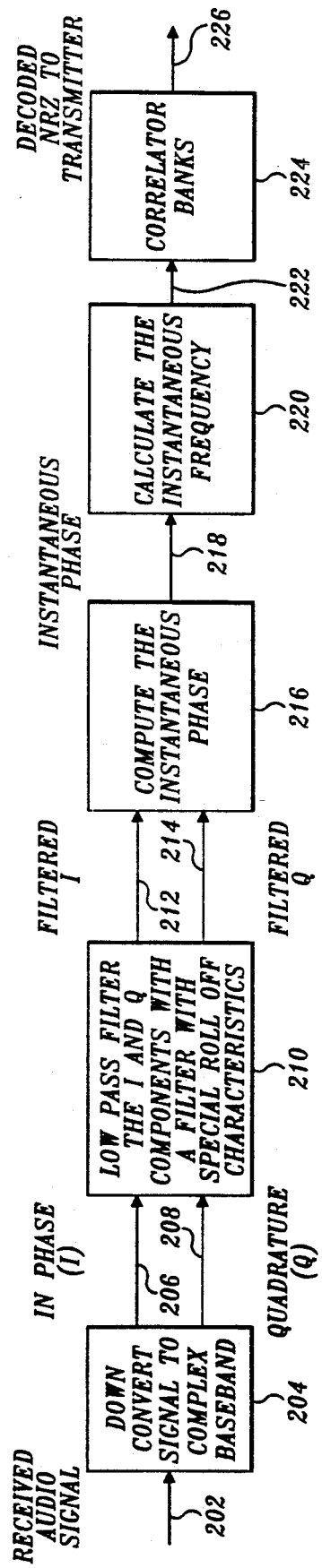
FIG. 9 is a functional block diagram of a demodulator in accordance with the present invention.

A block diagram illustrating the functions executed by demodulator 30a (or 30b) is shown generally at reference numeral 200 in FIG. 9. In a block 204, an audio (FSK modulated) signal 202 is applied to the input of the demodulator and down-converted to a complex baseband signal having an in-phase (or real) component 206 and a quadrature (or imaginary) component 208. The operation occurring in block 204 is a frequency down shift of the FSK modulated signal from a center frequency of approximately 1,700 Hz to a center frequency of DC (or 0 Hz). This operation creates a complex output, where the in-phase and quadrature components comprise the FSK modulated signal after it is down-shifted to a center frequency of 0 Hz. In-phase component 206 and quadrature component 208 are then low pass filtered in a block 210 to attenuate frequencies above approximately 1,500 Hz, thereby eliminating the undesired lower side band and filtering out unwanted noise. A filtered in-phase signal 212 and a filtered quadrature signal 214 resulting from the low pass filtering operation are used in a block 216 to compute an instantaneous phase signal 218, $\phi(n)$, of the complex baseband signal, which is defined by:

$$\phi(n) = ARG \text{ (filtered } I + j(\text{filtered } Q)) \tag{6}$$

where the term (filtered I) represents the filtered in-phase signal, and the term (filtered Q) represents the quadrature signal, j being equal to the square root of $-1$.

Instantaneous phase signal 218 is then used to determine the instantaneous frequency, f(n), in a block 220 by determining the time derivative of the instantaneous phase, $\phi$ (where $\Delta\phi(n)$ is the difference in phase between successive phase samples and $\Delta t$ is the time period between the successive samples), i.e.:

$$f(n) = \Delta\phi(n)/\Delta t \tag{7}$$

To better understand how the filtered complex baseband signal relates to the FSK modulated signal, it may be helpful to consider an X-Y plot of the filtered in-phase and quadrature signals for an FSK modulated signal input to the demodulator, which comprises a 1,700 Hz carrier (center) frequency shifted by a 720 Hz FSK tone, i.e., shifted to 2420 Hz. In this case, since the sum of $I^2 + Q^2$ is a constant, the X-Y plot of the filtered I and Q signals yields a vector having a constant length, which rotates at a rate of 720 Hz in a positive or counterclockwise direction (since the phase angle of the signal increases at a linear rate in time). If the input frequency changes to 980 Hz (1,700 Hz−720 Hz) to represent a bit of the opposite logic level, the vector instantaneously stops rotating counterclockwise and begins rotating in the opposite or clockwise direction at −720 Hz; this direction of rotation corresponds to an instantaneous frequency, f(n), (from block 220) equal to −720 Hz. However, because the I and Q signals are filtered, thereby introducing a time constant that smooths changes in frequency, instead of stopping instantaneously, the rotating vector smoothly decelerates from +720 Hz to 0 Hz, then reverses direction and begins smoothly accelerating in the clockwise direction to −720 Hz.

A demodulated output signal 222 is determined simply by considering the sign of the frequency, a negative frequency indicating a binary logic level 1 and a positive frequency indicating a binary logic level 0. Demodulated output signal 222 is applied to a bank of correlators 224, which reduce or substantially eliminate any jitter on the bit transitions between zero and one (or vice versa) by averaging the data zero crossings over time and determining bit transitions of the demodulated data based on a probability density corresponding to the data rate at which the FSK modulated signal was transmitted.

During bit transitions in the data message, the FSK modulated signal output from modulator 26 does not shift instantaneously in frequency because it is a band limited signal, and instantaneous frequency shifts in theory require an infinite bandwidth. When changes in the logic level occur, the modulator produces a smooth frequency shift from 980 to 2,420 Hz (or vice versa). Accordingly, in demodulator 30, changes in frequency, f(n), that are reflective of a bit transition occur smoothly, as the instantaneous frequency of the complex baseband signal shifts between −720 and +720 Hz (or vice versa).

Figure 13:
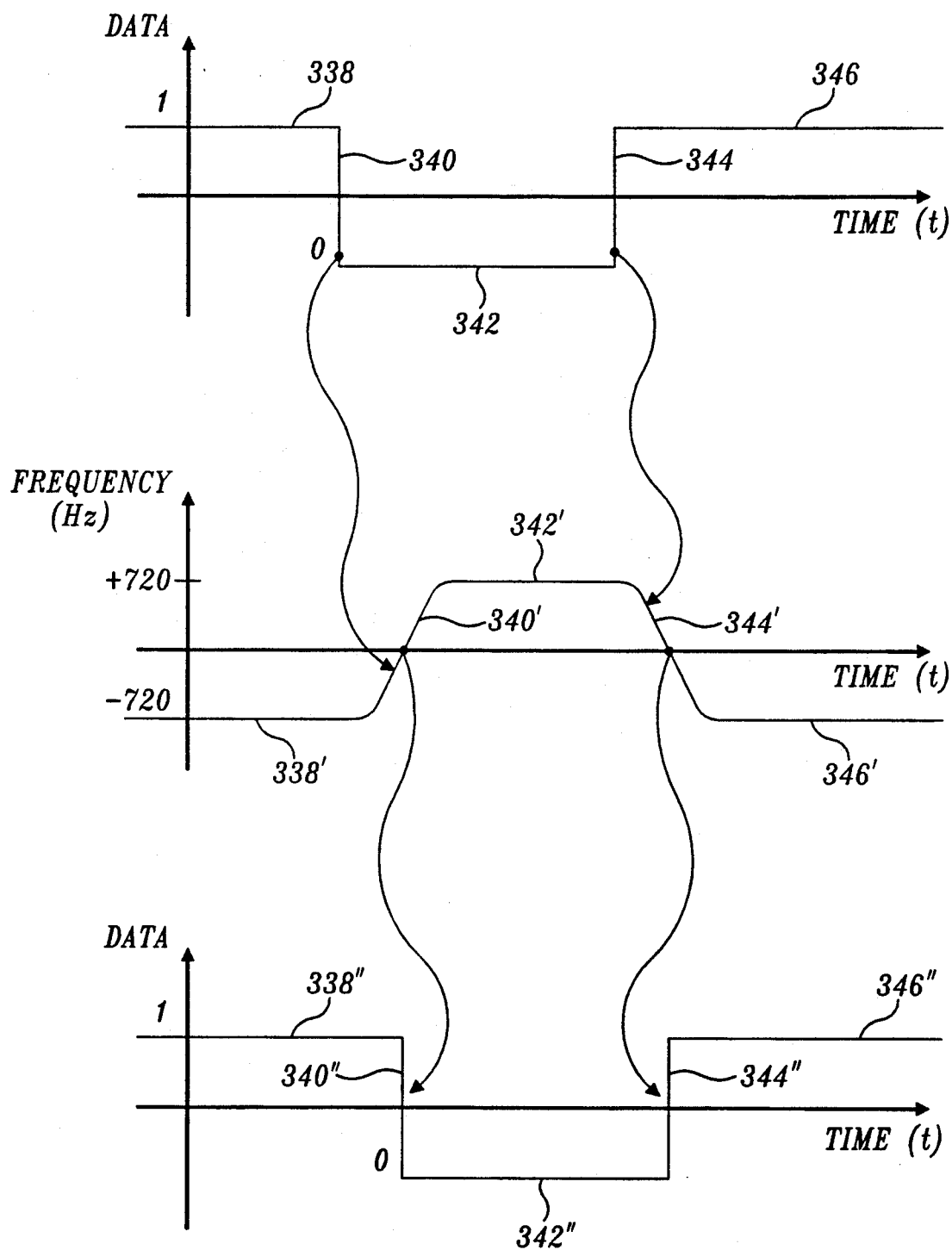
FIG. 13 graphically illustrates, over time, the data input to the modulator, the corresponding demodulator frequency determination of the FSK tones that is made during the demodulation process, and the corresponding demodulated output data.

This gradual change in frequency corresponding to the data message that was initially modulated and to the demodulated output signal is shown in FIG. 13. At the top of the figure is a portion of the NRZ data message that was originally input to modulator 26. Initially, a logic level one is input, represented by a line 338. The signal changes at a vertical line 340 to a logic level zero, represented by a line 342. A line 344 indicates a transition back to a logic level one, which is represented by a line 346. Corresponding demodulator frequencies, f(n), are shown in the graph at the middle of the figure, with the same reference numbers being used, but with a prime notation to indicate the correspondence to the NRZ data that were previously modulated. Similarly, the demodulated data output from demodulator 30 are shown at the bottom of the figure, with double-prime notation being applied to the same reference numbers to indicate the correspondence to the NRZ data. It should be apparent that bit changes in the input data (top of figure) cause the frequency of the demodulator to change smoothly, but not instantaneously, at lines 340' and 344'. Note that bit transitions reflected in frequency changes in demodulator 30 are very accurate with respect to jitter, even though there is a constant time delay (a typical value is approximately 7 ms) between the modulator data input and demodulator data output, which has no effect on system performance.

Those of ordinary skill in the art will appreciate that instead of converting the modulated signal to a complex baseband signal centered around DC or zero Hz, it can be processed by a complex filter, such as by using a Hilbert transform, to eliminate the negative frequency portion of the signal, leaving only the positive portion. For example, after thus complex filtering an FSK modulated signal conveyed on a 1,700 Hz carrier, only the positive frequency portion centered around that frequency, modulated ±720 Hz, would remain. This signal would then be processed as described above, to determine the instantaneous phase, the corresponding instantaneous frequency, and thus, the data message conveyed by the FSK modulated signal.

Figure 10:
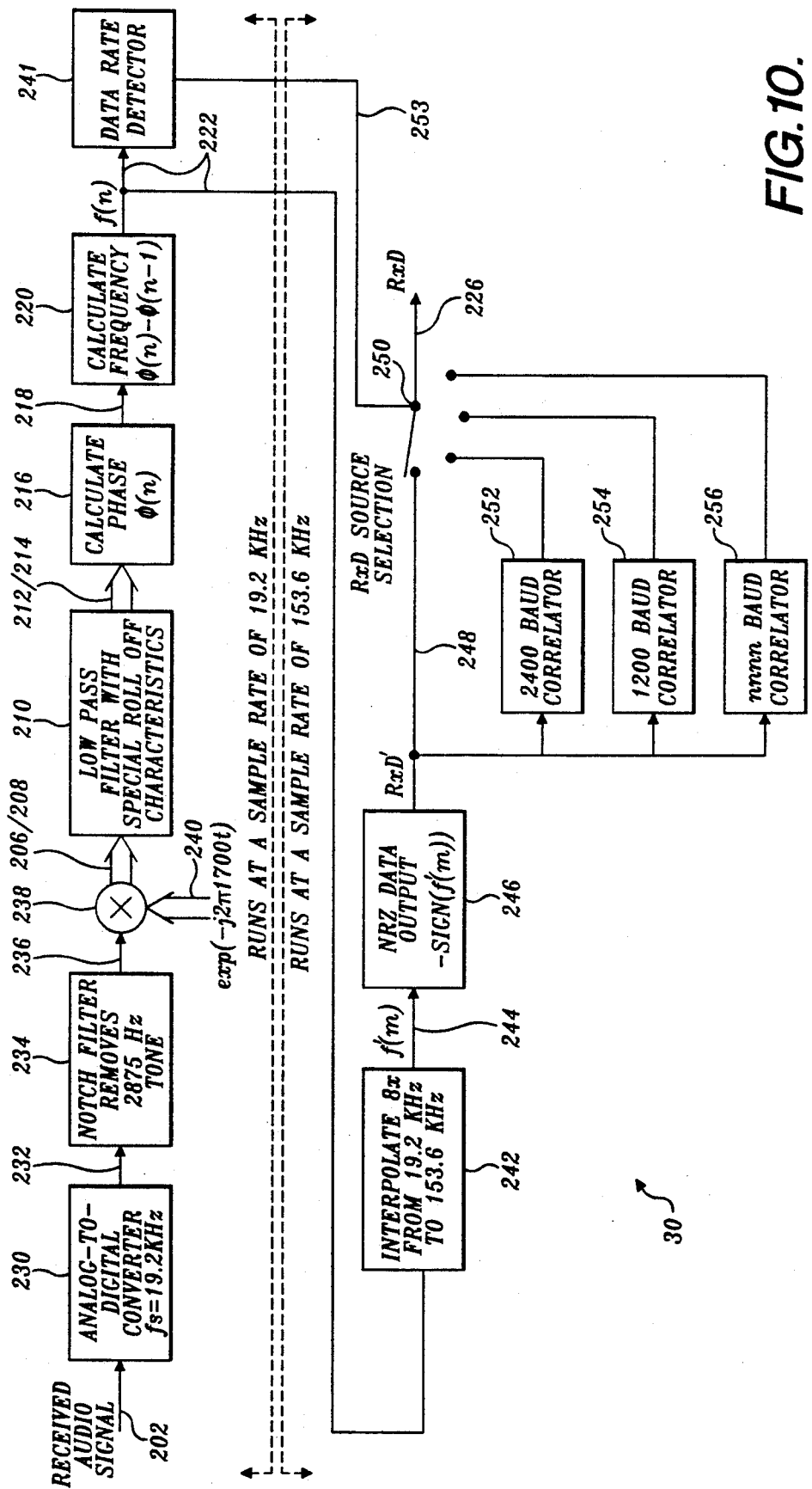
FIG. 10 is a more detailed block diagram of the demodulator as implemented using a digital signal processor (DSP)
Figure 15:
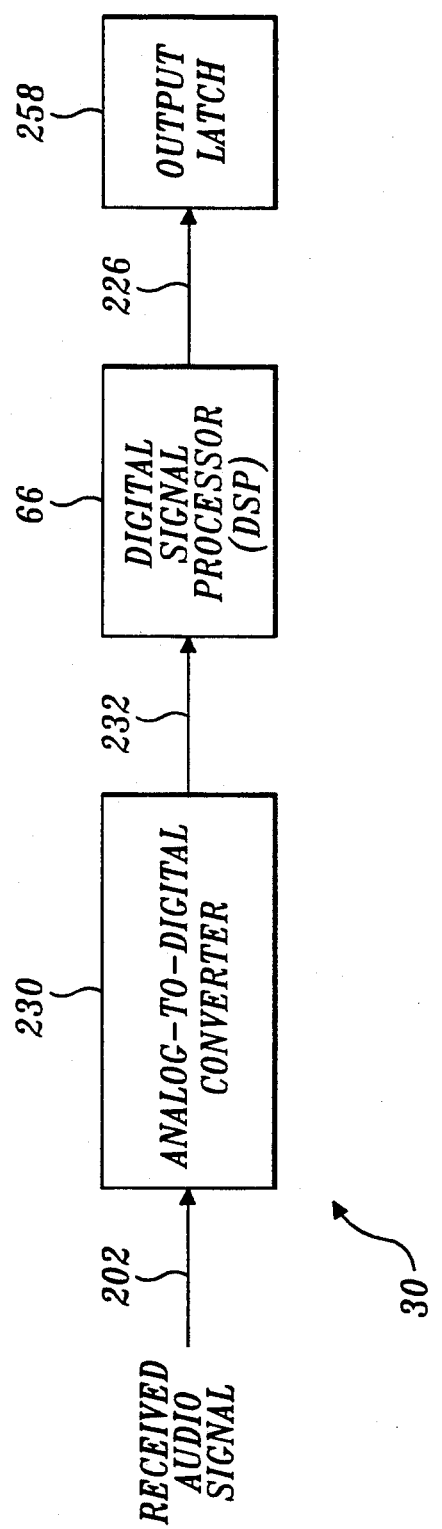
FIG. 15 is a block diagram showing the components of the demodulator as implemented with the DSP.

In FIG. 10, a more detailed functional diagram of demodulator 30 illustrates how the FSK modulated signal is processed to recover the data message conveyed thereby. FIG. 15 shows the demodulator in block diagram, as implemented with DSP 66. The FSK modulated signal is initially input to an analog-to-digital converter (ADC) 230, which, in the preferred embodiment, has a sample rate of 19.2 KHz, so that the modulated signal is digitized by sampling it at 52 µs intervals. A digitized modulated signal 232 produced by the ADC is then applied to a digital notch filter 234, which attenuates a 2,875 Hz tone used as a control signal in the simulcast paging system. In other applications of the modem, notch filter 234 could be omitted, since it is only required to attenuate the 2,875 Hz tone present when demodulator 30 is used in a simulcast paging system. A notchfiltered, digitized signal 236 is applied to a multiplier 238, which multiplies it by a complex exponential function, $\exp(-j\,2\pi 1{,}700t)$, identified by reference numeral 240, to shift the center frequency from 1,700 Hz down to 0 Hz and, at the same time, to produce the complex baseband signal that includes the in-phase and quadrature components of the down-converted signal, i.e., the x(n)+jy(n) components.

As noted above, the in-phase and quadrature components are applied to a low pass filter 210 to attenuate all frequencies above about 1,500 Hz, yielding filtered in-phase signal 212 and filtered quadrature signal 214, both of which are input to phase determinative means 216. The instantaneous phase of each sample, $\phi(n)$, is determined as described above, from the argument of the filtered in-phase and filtered quadrature components using an inverse tangent function with rotations to determine the phase angle domain between $\pm\pi$. The instantaneous phase signal 218 is input to frequency determinative means 220. Frequency determinative means 220 determine the instantaneous frequency, f(n), by taking the difference between the current instantaneous phase, $\phi(n)$ and the instantaneous phase of the previous sample, $\phi(n-1)$. By computing the phase differential, $\Delta\phi$, for the current and previous samples, the demodulator effectively determines the time derivative of the phase, and thus, the instantaneous frequency, f(n).

Figure 14:
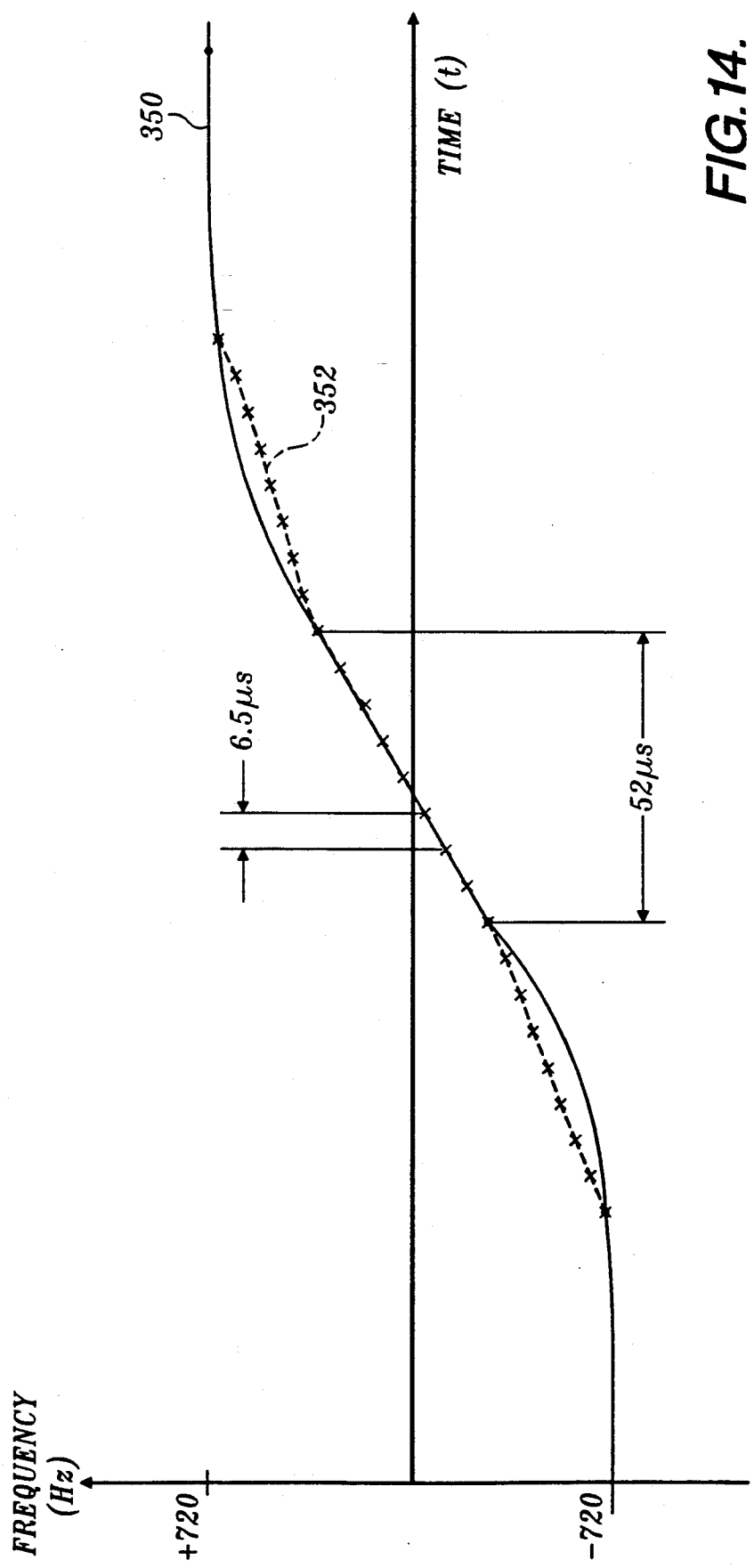
FIG. 14 is a graph showing the interpolation of frequency by the demodulator to improve the resolution with which the sign of the frequency is determined, in defining the logic level of the demodulated output data.

The frequency signal is applied both to a data rate detector 241 and to an 8X interpolator 242, which runs at an effective sample rate of 153.6 KHz. The interpolator determines intermediate samples of the frequency signal seven times between each major sample, i.e., seven times between f(n) and f(n-1). By interpolating the frequency signal between each major sample made at 19.2 KHz with a sample rate eight times as great, the resolution with which the sign of the frequency signal is determined (i.e., its zero crossing) is substantially enhanced, thereby greatly reducing the effect of jitter on the demodulated signal. The interpolation scheme used is a linear process, which is effectively carried out as shown in FIG. 14, by connecting the frequencies of each of the major samples that occur at 52 $\mu$s intervals with a straight line and then sampling the instantaneous frequency f(n) between the major sample times at the 153.6 KHz rate to produce a frequency f'(m) value at 6.5 $\mu$s intervals. In FIG. 14, a line 350 shows the actual frequency signal and a dashed line 352 indicates the interpolated frequency that is sampled at the higher sample rate (each such sample being indicated by an X on the dashed line) to improve the resolution with which the sign of the frequency and its zero crossover that occurs at each bit transition is determined. Note that the interpolation process can alternatively be applied to the complex signal, the filtered signals, or the phase signal rather than to the frequency signal.

An interpolated signal 244, f'(m), produced by the interpolation is applied to a box 246 wherein the sign of the interpolated signal (+ or −) is used to determine the demodulated NRZ data, thereby reproducing the data message that was originally modulated by modulator 26. A demodulated signal 248 resulting from this determination is identified in the drawing by RxD'. Demodulated signal 248 is applied to the inputs of plurality of correlators, including: a 2,400 baud correlator 252, a 1,200 baud correlator 254, and optionally, to the input of additional correlators of other baud rates, nnnn, identified generally by reference numeral 256. A switch 250 selects one of the correlator outputs, or alternatively, selects demodulated signal 248 directly if the modulated signal applied to the input of demodulator 30 was conveyed at a data rate that does not correspond to the data rate of any of correlators 252 through 256.

Switch 250 is controlled by a data rate signal 253 produced by data rate detector 241, to ensure that the output of the appropriate correlator is selected (or none of the correlator outputs is selected if the appropriate data rate correlator is not available). It should be apparent that the data rate signal can be used to simply select a specific zero crossing correlator data rate, rather than selecting the output used from among a plurality of such correlators, particularly since the correlators are preferably implemented in software by DSP 66.

Each correlator 252 through 256 comprises a sharp (high Q) digital band pass filter that is tuned to a frequency equivalent to the data rate of the input signal. From demodulated signal 248, a sequence of unit impulses is generated at the bit transition time, occurring generally (but not precisely) at the time of the input data bit transitions, and the output of each correlator comprises a sine wave that is synchronized to the bit transitions at the nominal data rate. Thus, the 2,400 baud correlator generates a 2,400 Hz sine wave with a positive zero crossing at each data bit transition time. The time constant of the filters comprising the correlators is several tens of bits long (at the nominal data rate of the correlator), thereby causing the zero crossing of the correlator output signal to occur at times based on the average of the last several tens of zero crossings. For example, at a data rate of 2,400 baud and for a data message comprising a 1010 data pattern, data transitions should occur every 416.7 $\mu$s. However, due to jitter on the demodulated signal, bit transitions may actually occur, for example, at intervals anywhere from 400 $\mu$s to 433 $\mu$s. Nevertheless, the long-term average of the intervals between bit transitions should be approximately 416.7 $\mu$s. The 2,400 baud correlator averages the demodulated data bit transitions so that the positive zero crossings have a very high probability of alignment with the 416.7 $\mu$s time. Each data bit at the correlator output is then updated only at the positive zero crossing time and any slight misalignments are compensated by adjusting the bit transitions so that they occur at the correct time based on the average. The correlators thus substantially reduce the jitter introduced by noise on the FSK modulated signal. In tests of demodulator 30, a change from 40 dB SINAD to 15 dB SINAD caused only about a 20% degradation in jitter level, as compared to an increase of several hundred percent jitter level without use of the correlators.

Figure 12B:
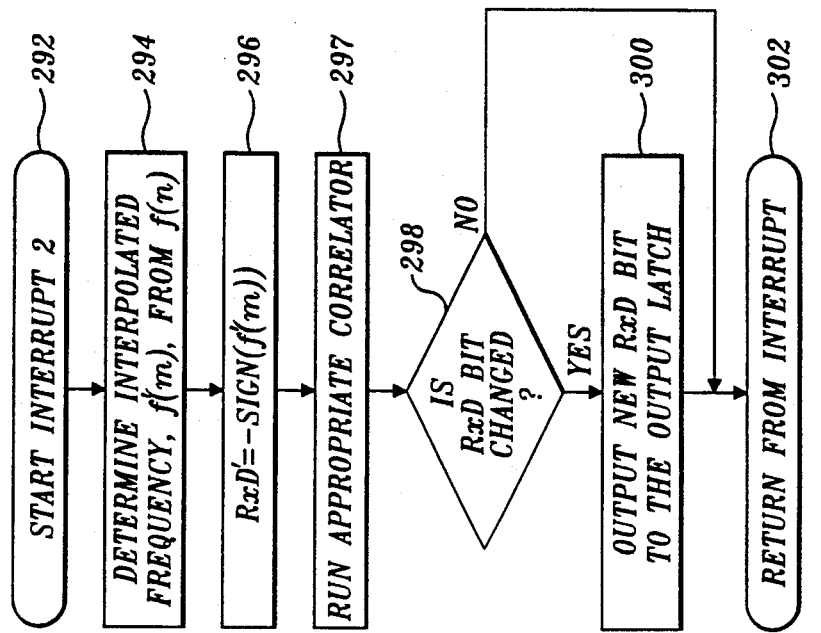
FIGS. 12A through 12C are flow charts illustrating the logical steps implemented by the demodulator comprising the present invention, in producing a demodulated output signal.
Figure 12A:
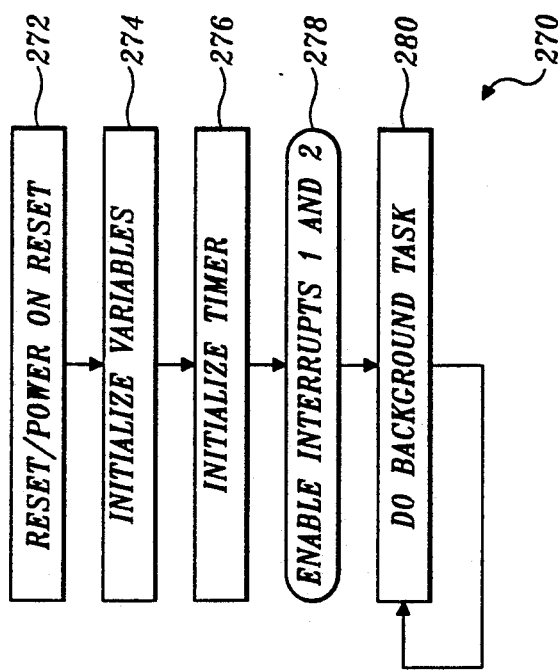
Figure 12C:
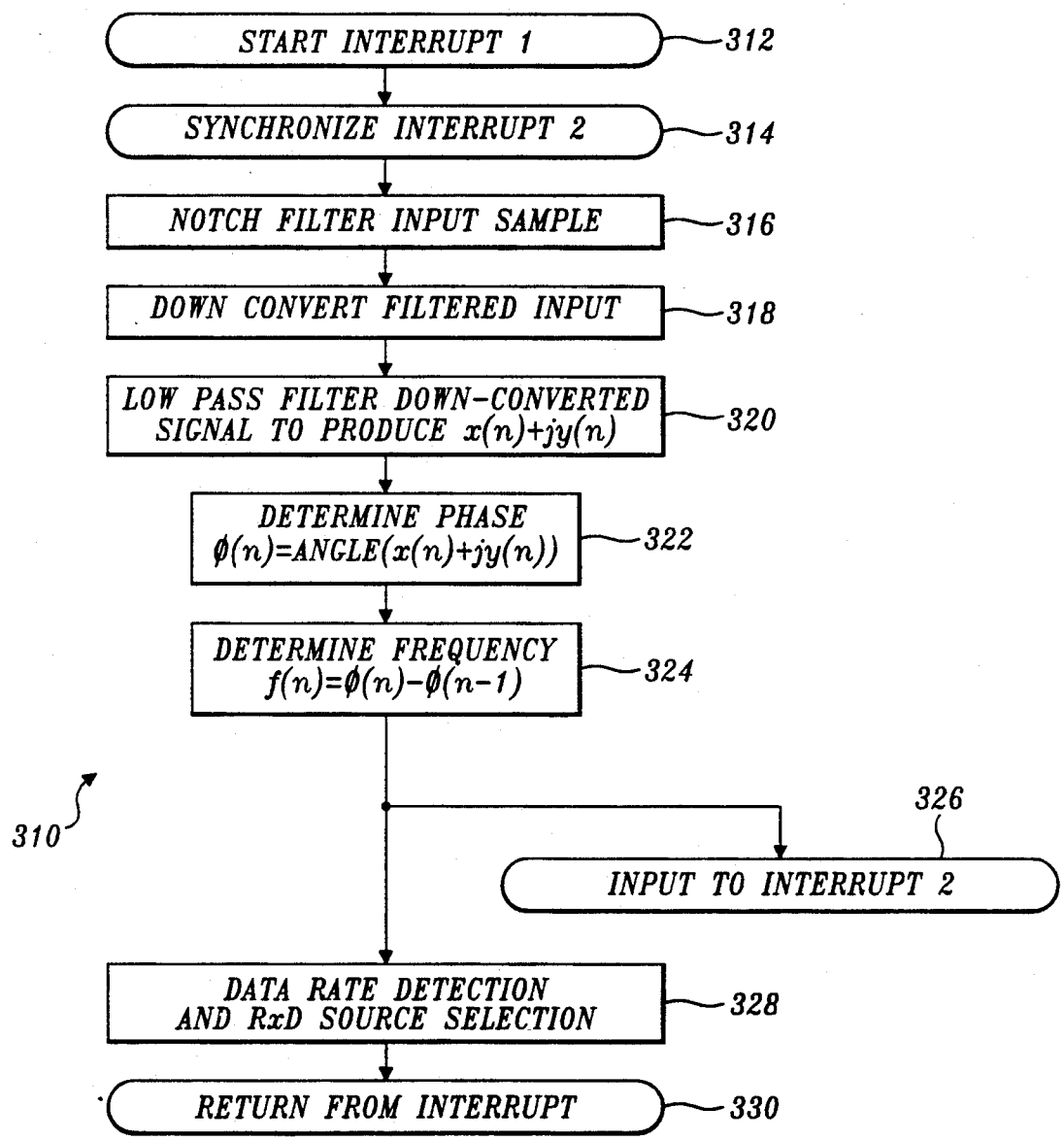

Virtually all of blocks 234 through 256 are implemented by DSP 66 (FIG. 15) following the logic illustrated in flow charts 270, 290, and 310, shown in FIGS. 12A through 12C, respectively. In flow chart 270 (FIG. 12A), a block 272 resets the DSP, the reset occurring automatically each time that demodulator 30 is powered up or reset by transmitter controller 43 (FIG. 1). A block 274 initializes variables used during the demodulation process, and a block 276 initializes an auto-reload timer that times out at the 153.6 KHz sample rate, each time out causing execution of interrupt 2, shown in flow chart 290 in FIG. 12B. A block 278 enables interrupts 1 and 2 and proceeds to a block 280, which carries out general background supervisory tasks of the demodulator.

Referring to flow chart 310 shown in FIG. 12C, interrupt 1 starts at a block 312 each time that a new sample is available at the ADC 230, i.e., at the beginning of each major sample period, which occurs every 52 $\mu$s at the 19.2 KHz sample rate. After interrupt 1 starts, it synchronizes interrupt 2 in a block 314 by writing a predetermined constant to the auto-reload timer, causing it to begin its count down from the predetermined constant to zero; this synchronization step ensures that interrupt 2 remains in step with input samples taken at each major sample interval.

In block 316, interrupt 1 notch filters the input sample to substantially attenuate the 2,875 Hz tone that is present in simulcast paging systems. The notch filter implemented in block 316 uses a conventional digital filter technique, well known to those of ordinary skill in the art.

In block 318, interrupt 1 down converts the notch filtered digital input signal, shifting its center frequency from 1,700 Hz to 0 Hz by multiplying the signal by the exponential function, $\exp(-j2\pi 1,700\ t)$. The down conversion process also produces the in-phase and quadrature signals that are low pass filtered by DSP 66, again applying conventional digital filtering algorithms to substantially attenuate frequencies above approximately 1,500 Hz.

Figure 11A:
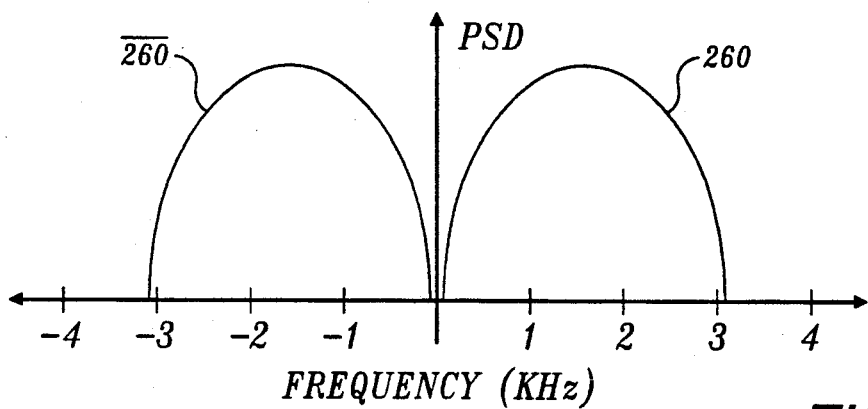
FIGS. 11A through 11C are power spectral density plots of signals at several stages in the demodulation process.
Figure 11B:
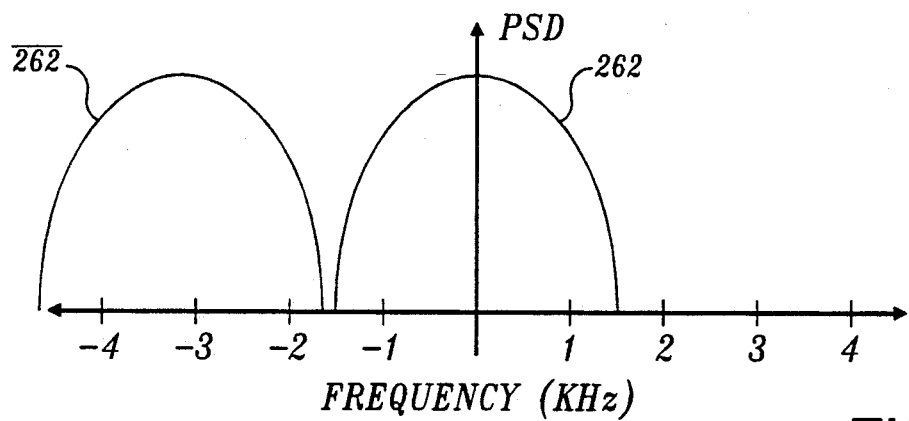
Figure 11C:
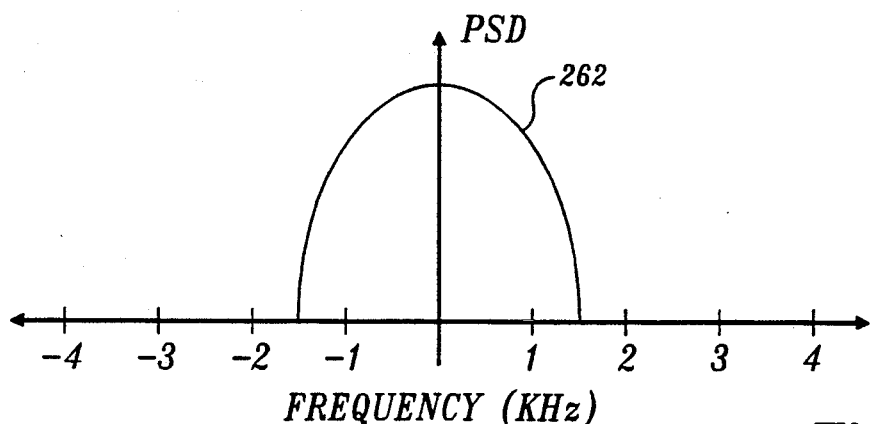

FIG. 11A illustrates the power spectral density for the modulated input signal processed by demodulator 30, which includes a positive frequency power spectral density 260 and a corresponding negative frequency power spectral density $\overline{260}$, centered around 1,700 Hz and $-1,700$ Hz, respectively. In FIG. 11B, a power spectral density 262 is illustrated for the complex baseband signal, which has a corresponding negative frequency power spectral density $\overline{262}$. The complex baseband power spectral density 262 is centered around 0 Hz. After being low pass filtered, the corresponding negative frequency power spectral density $\overline{262}$ is substantially eliminated, leaving only the complex power spectral density 262, as shown in FIG. 11C.

In a block 320, the low pass filtering operation is implemented as described above, so that filtered in-phase and quadrature signals x(n) and jy(n) are available for determining the instantaneous phase, which is carried out by DSP 66 in a block 322. Based upon the instantaneous phase of the current sample and of the preceding sample, DSP 66 determines the instantaneous frequency, f(n), in a block 324, which corresponds to the time derivative of the phase. The instantaneous frequency f(n) is input to interrupt 2 in a block 326. A block 328 provides for detection of the data rate, based upon the time between bit transitions; in response to the detected data rate, DSP 66 selects the appropriate zero crossing correlator (or data rate for the correlation process) to correlate the interpolated data (developed by interrupt 2). The program logic returns from interrupt 1 in a block 330, awaiting the next major sample of the FSK modulated signal.

Referring now to FIG. 12B, flow chart 290 shows the steps carried out by DSP 66 when interrupt 2 starts in a block 292, each time that the auto reset timers counts down to zero at the 153.6 KHz rate. In a block 294, DSP 66 determines the interpolated frequency f'(m) from the instantaneous frequency f(n) by interpolating the signal eight times each major sample period, providing a resolution of 6.5 $\mu$s on the NRZ output data and minimizing jitter so that its peak value is about $\pm 3.25$ $\mu$s.

In a block 296, the interpolated frequency is used to determine the logic level of the data message based upon the sign (+ or −) of the frequency signal f'(m). Note that FIG. 13 shows that the sign of f'(m) should be reversed to recover the correct logic level.

Based upon the data rate detected in block 328 of FIG. 12C, DSP 66 selects the appropriate zero crossing correlator in a block 297. Correlation of the demodulated output signal, RxD', further reduces jitter by averaging data transitions over time and synchronizing demodulated data transitions to the data rate, as explained above, producing a demodulated output signal RxD.

A decision block 298 determines if a data bit in the RxD demodulated output signal has changed, and if it has, DSP 66 supplies the new data bit to an output latch 258 (FIG. 15), in a block 300. The output latch is a hardware output line, which is coupled to paging transmitter 34 through transmitter controller 43, so that the paging data is transmitted to the paging units carried by the system's customers (FIG. 1). Assuming a negative response from decision block 298, or following block 300, a block 302 returns from interrupt 2, waiting to run interrupt 2 when the auto-reset timer again times out.

Demodulator 30 thus produces a demodulated output signal RxD that includes each bit in the original data message that was modulated for transmission to the demodulator by modulator 26. Furthermore, the demodulated data has an extremely low peak jitter, even when the modulated signal is transmitted over a link to simulcast paging transmitters 34 that are experiencing a significant noise level.

Although demodulator 30 has been implemented in software using DSP 66, those of ordinary skill in the art will appreciate that it could also be implemented in hardware, or using a conventional central processing unit to process the FSK modulated signal. The preferred embodiment of demodulator 30 implements most of its functions using DSP 66 to minimize cost and substantially reduce the number of components required. Since DSP 66 is used for both modulator 26 and demodulator 30, the resulting modem comprised of these elements is both compact and relatively inexpensive.

While the preferred embodiments of the invention have been illustrated and described, it will be appreciated that further changes can be made therein without departing from the spirit and scope of the invention. Accordingly, the scope of the invention should not be limited by the disclosure, but instead, should be determined entirely by reference to the claims that follow.

The embodiments of the invention in which an exclusive property or privilege is claimed are defined as follows:

1. In a modem, a modulator for modulating data, producing an output signal that conveys the data over a data channel at a data rate, said modulator comprising:
   (a) tone generation means for generating frequency shift keyed (FSK) tones that are modulated by the data about a first center frequency that is substantially different than a center frequency of the data channel that carries the output signal of the modulator;
   (b) a filter, coupled to the tone generation means to receive the modulated FSK tones, said filter producing a filtered signal having a bandwidth that is less than or substantially equal to the bandwidth of the data channel; and
   (c) means for frequency shifting the filtered signal so that a frequency spectrum of the modulated FSK tones comprising the filtered signal is contained within the data channel, thereby substantially eliminating an interference between positive and negative images of the frequency spectrum of the output signal of the modulator.

2. The modulator of claim 1, wherein the first center frequency is substantially greater than the center frequency of the data channel, and wherein the means for frequency shifting the filtered signal shift it downwardly into the frequency spectrum of the output signal.

3. The modulator of claim 1, wherein the first center frequency is substantially equal to zero Hz, so that FSK tones comprise a complex spectrum having a real portion and an imaginary portion, and wherein said means for frequency shifting the filtered signal shift in into the frequency spectrum of the output signal.

4. The modulator of claim 3, wherein the filter has a band pass frequency range that includes zero Hz.

5. A modulator for modulating data in a modem, producing an output signal conveying the data over a data channel at a data rate, said modulator comprising:
   edge detection means, connected to receive the data that is to be modulated, for detecting an edge at which the data change state and producing an edge detect signal in response thereto, said change in state occurring when the data change between logic levels; and
   interpolation means, coupled to receive the edge detect signal and the data that are to be modulated, for sampling the data at a predefined sample rate and modulating a FSK signal having upper and lower frequencies centered about a first frequency in response to the logic levels of the data, said upper frequency corresponding to one logic level and said lower frequency corresponding to a different logic level, the logic level used to modulate the FSK signal being determined by the interpolation means as a function of the edge detect signal to increase the resolution with which the FSK signal is modulated by the data, thereby minimizing jitter in said signal.

6. The modulator of claim 5, further comprising:
   a filter having an input that is coupled to the interpolation means to receive the FSK signal, said filter substantially attenuating frequencies outside a predetermined bandwidth, producing a filtered FSK signal; and
   means for frequency shifting the center frequency of the FSK signal so that it is within a bandwidth of the data channel.

7. The modulator of claim 5, further comprising:
   a digital-to-analog converter (DAC) that has an input coupled to receive the FSK signal, and which produces a corresponding analog FSK signal.

8. The modulator of claim 7, further comprising:
   a post filter having an input coupled to receive the analog FSK signal, producing a filtered analog FSK signal that is output from the modulator.

9. The modulator of claim 5, wherein the interpolation means comprise a timer and wherein the edge detect signal causes a then current time on the timer to be retained, so that the interpolation mean can determine a time interval since a previous sample interrupt occurred, each sample interrupt occurring at times spaced apart by a sample interval defined by the sample rate.

10. The modulator of claim 9, wherein the interpolation means further comprise a processor that interpolates the time during the sample interval at which the edge detect signal indicated a change in the logic level of the data based upon the current time at which the edge detect signal cause the current time on the timer to be retained, thereby improving the resolution with which such changes modulate the FSK signal and reducing jitter on it, by more accurately determining an incremental change in phase of the FSK signal.

11. The modulator of claim 5, further comprising an input latch that has an input connected to receive the data and an output coupled to the interpolation means, the data latch temporarily storing the input data while it is sampled by the interpolation means.

12. The modulator of claim 5, wherein the data are coupled asynchronously to the interpolation means and the data rate is variable, with a maximum value in excess of 1,500 baud.

* * * * *

UNITED STATES PATENT AND TRADEMARK OFFICE
CERTIFICATE OF CORRECTION

PATENT NO. : 5,227,741
DATED : July 13, 1993
INVENTOR(S) : R. F. Marchetto et al.

It is certified that error appears in the above-identified patent and that said Letters Patent is hereby corrected as shown below:

| COLUMN | LINE | |
|---|---|---|
| 1 | 68 | "overlappong" should read --overlapping-- |
| 8 | 17 | "alises" should read --aliases-- |
| 9 | 23 | "than" should read --that-- |
| 13 | 46 | "(TCS*$\Delta\theta_M$)/640)" should read --((TCS*$\Delta\theta_M$)/640)-- |
| 13 | 68 | after "coefficients" insert --for-- |
| 16 | 65 | "notchfiltered" should read --notch-filtered-- |

Signed and Sealed this

Twenty-fourth Day of May, 1994

Attest:

BRUCE LEHMAN

*Attesting Officer*    *Commissioner of Patents and Trademarks*